(12) United States Patent
Corella et al.

(10) Patent No.: US 9,185,111 B2
(45) Date of Patent: Nov. 10, 2015

(54) CRYPTOGRAPHIC AUTHENTICATION TECHNIQUES FOR MOBILE DEVICES

(71) Applicants: Francisco Corella, San Jose, CA (US); Karen Pomian Lewison, San Jose, CA (US)

(72) Inventors: Francisco Corella, San Jose, CA (US); Karen Pomian Lewison, San Jose, CA (US)

(73) Assignee: Pomian & Corella, LLC, Carmichael, CA (US)

( * ) Notice: Subject to any disclaimer, the term of this patent is extended or adjusted under 35 U.S.C. 154(b) by 48 days.

(21) Appl. No.: 13/954,973

(22) Filed: Jul. 30, 2013

(65) Prior Publication Data

US 2014/0032906 A1 Jan. 30, 2014

Related U.S. Application Data

(60) Provisional application No. 61/677,011, filed on Jul. 30, 2012, provisional application No. 61/804,638, filed on Mar. 23, 2013, provisional application No. 61/809,790, filed on Apr. 8, 2013.

(51) Int. Cl.
    H04L 29/06 (2006.01)

(52) U.S. Cl.
    CPC ........ *H04L 63/0876* (2013.01); *H04L 63/0869* (2013.01); *H04L 2463/082* (2013.01)

(58) Field of Classification Search
    CPC . H04L 9/3247; H04L 63/0861; H04L 9/3231; H04L 9/32; G06F 21/32
    See application file for complete search history.

(56) References Cited

U.S. PATENT DOCUMENTS

| | | | |
|---|---|---|---|
| 6,170,058 B1 | 1/2001 | Kausik | |
| 6,956,950 B2 | 10/2005 | Kausik | |
| 7,328,350 B2 | 2/2008 | Hird | |
| 7,454,782 B2 | 11/2008 | Rajasekaran et al. | |
| 2012/0204035 A1* | 8/2012 | Camenisch et al. | 713/186 |

OTHER PUBLICATIONS

Xavier Boyen. Reusable cryptographic fuzzy extractors. ACM Conference on Computer and Communications Security, Oct. 25-29, 2004, Washington, DC, USA, pp. 82-91. ACM Press, 2004. Section 8 describes an authentication method that combines biometrics with public key cryptography.

Ari Juels and Martin Wattenberg. A Fuzzy Commitment Scheme. ACM Conference on Computer and Communications Security, Nov. 1-4, 1999, Singapore, pp. 28-36. ACM, 1999. The paragraph on p. 33, lines 18-36 describes an authentication method that combines biometrics with public key cryptography.

\* cited by examiner

*Primary Examiner* — Izunna Okeke

(57) ABSTRACT

A method of authenticating a computing device to a back-end subsystem. In one embodiment a prover black-box in the computing device regenerates a credential containing a key pair from a PIN and a protocredential, and authenticates cryptographically to a verifier black-box in the back-end subsystem; then the verifier black-box sends an authentication token to the prover black-box as verifiable confirmation of the cryptographic authentication, the prover black-box sends the authentication token to an application front-end in the computing device, the application front-end sends the authentication token to an application back-end in the back-end subsystem, and the application back-end verifies the authentication token.

19 Claims, 38 Drawing Sheets

1800
(process used at step 1230 of process 1200)

CRYPTOGRAPHIC AUTHENTICATION TECHNIQUES FOR MOBILE DEVICES

CROSS-REFERENCE TO RELATED APPLICATIONS

This application is a continuation-in-part of U.S. application Ser. No. 13/925,824, filed Jun. 24, 2013, which claims priority to U.S. Provisional Application Ser. No. 61/663,569, filed on Jun. 23, 2012, U.S. Provisional Application Ser. No. 61/677,011, filed on Jul. 30, 2012, U.S. Provisional Application Ser. No. 61/804,638, filed on Mar. 23, 2013, and U.S. Provisional Application Ser. No. 61/809,790, filed on Apr. 8, 2013, all of which applications are incorporated by reference herein.

BACKGROUND

Passwords are commonly used for returning-user authentication to a software application back-end across a network such as the Internet, but they have well known security weaknesses, including vulnerability to phishing attacks, breaches of back-end database security, and reuse at malicious sites. Furthermore, passwords are ill-suited for use on mobile devices such as smart phones and tablets: entering a strong password with letters, digits and punctuation on a small touch screen keyboard is cumbersome, and password characters are exposed to shoulder surfing because they are echoed by the keyboard as they are being typed in an effort to prevent typographical errors.

Cryptography provides alternatives for returning-user authentication that are more secure and better suited for mobile devices. For example, a mobile device could authenticate to an application back-end by proving knowledge of a private key that is part of a key pair pertaining to a public key cryptosystem, a hash of the public key that is part of the same key pair having been previously registered with the application back-end; the user would be indirectly authenticated as the owner of the device. This is more secure than authentication with a password because the private key is not sent to the application back-end or stored in a back-end database; and it is better suited for mobile devices because it does not require typing a password.

Cryptography also allows a user to authenticate to an application back-end as having an identity or attributes asserted by a third-party, without the third-party being involved in the authentication transaction. For example, a computing device owned by the user may generate a key pair pertaining to a public key cryptosystem. The user may ask the third-party to sign a public key certificate binding the public key that is part of the key pair to one or more identifiers and/or attributes that the third-party is authoritative for, and may then store the public key certificate in the computing device together with the private key that is part of the key pair. The computing device may then authenticate to the application back-end by sending the certificate and proving knowledge of the private key. The user controlling the device is then indirectly authenticated as being entitled to the identifier and/or attributes.

Cryptography is currently used successfully for user authentication in some specific use cases, such as authentication of a US federal employee to the information system of a US federal agency using a public key certificate and its associated private key stored in a Personal Identity Verification (PIV) card connected to a personal computer. But cryptographic authentication is not broadly used outside such specific use cases.

But cryptographic authentication also has drawbacks.

One drawback is that it is difficult to implement for application developers. While user authentication with a password simply requires transmission of the password from a user's device to the application back-end, cryptographic authentication requires execution of a cryptographic protocol involving multiple cryptographic operations (such as digital signatures, verification of digital signatures, computation of cryptographic hashes, etc.) by multiple parties, and transmission of multiple messages between those parties. The details of the individual cryptographic operations performed by the parties to a cryptographic protocol are typically hidden from application developers in cryptographic libraries, but application developers must still cope with many difficulties. They must understand the cryptographic protocol, install cryptographic libraries, ensure that all parties agree on the parameters of the protocol, implement the sequence of messages and cryptographic operations required by the protocol, and handle errors and exceptions.

Another drawback is that it relies on one or more secrets stored in the user's device, such as a private key. Mobile devices are easily lost or stolen, hence the user's device may easily be captured by an adversary. If no precautions are taken the adversary may obtain the secrets used for cryptographic authentication and use them to impersonate the user. One precaution that can be taken, is to encrypt such secrets using an encryption key derived from a password supplied by the user. However, prior art techniques for encrypting the secrets allow the adversary to launch an offline dictionary attack against the password after capturing the device and obtaining the encrypted secrets. To resist the attack, the user must use a high-entropy password, which is not practical when the password must be entered on a small touch screen keyboard.

Hence there is a need for cryptographic authentication techniques, well suited for mobile devices, that are easier to implement for application developers and provide more effective protection against an adversary who captures a device.

SUMMARY

Improved techniques are provided for cryptographic authentication of a computing device to a back-end subsystem, which are well-suited for mobile devices, are easy for application developers to implement, and provide effective protection against an adversary who captures the computing device.

In one embodiment a prover black-box in the computing device regenerates a credential containing a key pair from a PIN and a protocredential, and authenticates cryptographically to a verifier black-box in the back-end subsystem by proving knowledge of the private key portion of the credential; then the verifier black-box sends an authentication token to the prover black-box as verifiable confirmation of the cryptographic authentication, the prover black-box sends the authentication token to an application front-end in the computing device, the application front-end sends the authentication token to an application back-end in the back-end subsystem, and the application back-end verifies the authentication token.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Reference numerals consist of a concatenation of a one- or two-digit number referring to a figure, followed by a two-digit number that locates the referenced part within the figure. A reference numeral introduced in a figure may be used in other figures to refer to the same part or a similar part.

DETAILED DESCRIPTION

This Detailed Description refers to the accompanying drawings, which are a part hereof and illustrate examples of embodiments of the invention. It is to be understood that other embodiments are possible, and that the features of different exemplary embodiments can be combined together unless otherwise stated.

Figure 1:
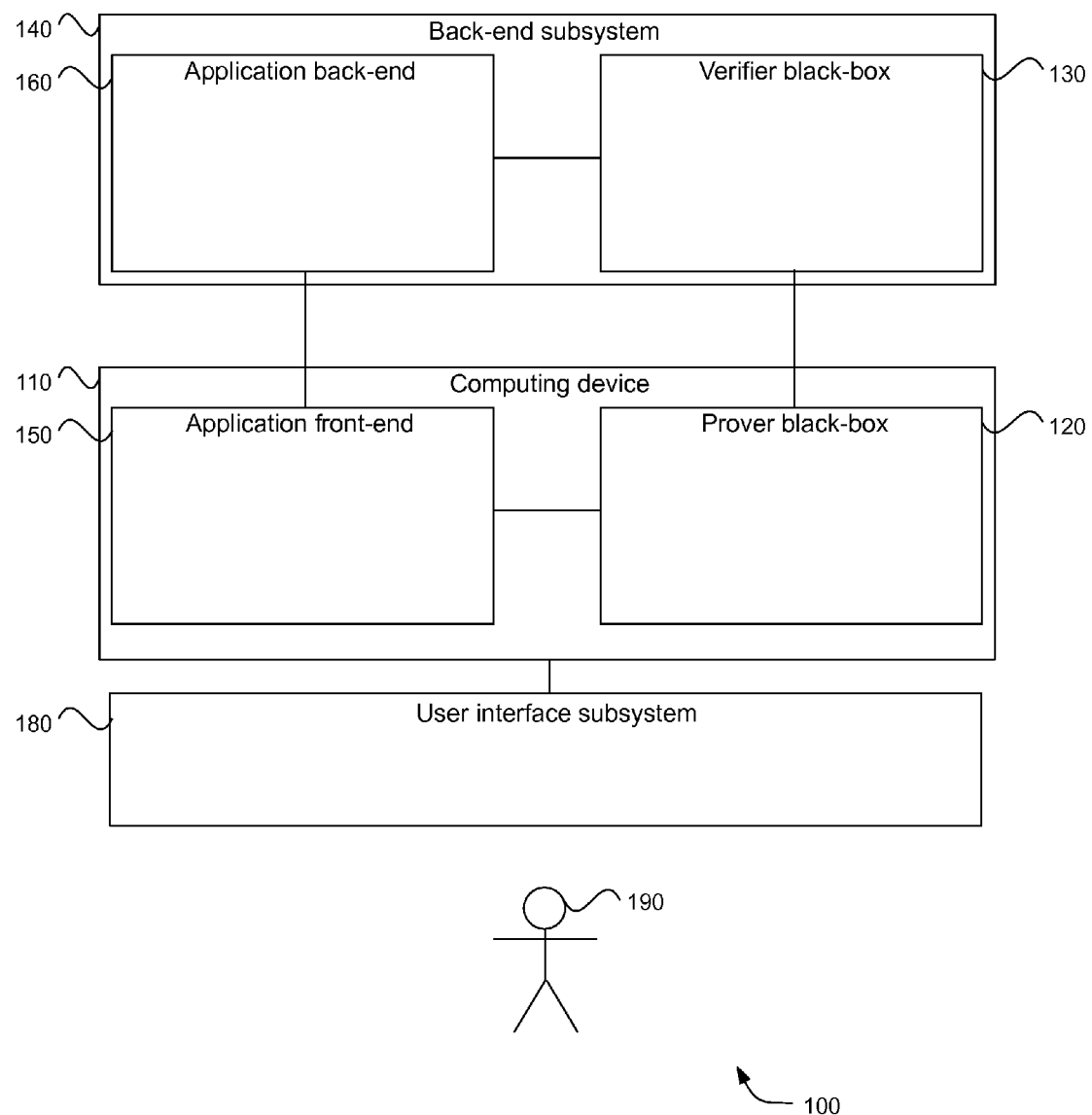
FIG. 1 is a block diagram generally illustrating a system for authenticating a computing device using a prover black-box and a verifier black-box, according to embodiments described herein.

FIG. 1 is a block diagram generally illustrating a system 100 for authenticating a computing device 110, which makes it easy for application developers to use cryptography by encapsulating cryptographic complexity in a prover black-box 120 and a verifier black-box 130.

(The terms "prover" and "verifier" refer to roles performed in cryptographic authentication. A "prover" is a computer or computing module that proves possession of one or more cryptographic credentials, while a "verifier" is a computer or computing module that verifies a proof of possession submitted by a prover. The term "black-box" refers to a computing module that is dedicated to a specific purpose and can be used without an understanding of its internal workings. The term "prover black-box" refers to a computing module that qualifies as a black box and plays the role of prover. The term "verifier black-box" refers to a computing module that qualifies as a black box and plays the role of verifier.)

The computing device 110 is controlled by a user 190 via a user interface subsystem 180. In one embodiment the device is a mobile device such as a smart phone or a tablet and the user interface subsystem comprises a touch screen built into the device. In another embodiment the device is a laptop computer and the user interface subsystem comprises a keyboard and a trackpad built into the computer. In another embodiment the device is a desktop computer and the interface subsystem comprises a keyboard and a mouse connected to the computer. In another embodiment the device is a smart card connected to a computer system, and user interface subsystem 180 is part of the computer system.

(The user interface subsystem is omitted from some of the subsequent figures for lack of space, but is to be understood as being present and connected or built into the computing device 110.)

The computing device 110 authenticates to a back-end subsystem 140 over a network such as the Internet. Authentication of the device indirectly authenticates the user 190 as the owner of the device.

The user interacts with an application front-end 150 running on the device, which communicates over the network with an application back-end 160 that is part of the back-end subsystem. The prover black-box 120 runs on the computing device and communicates with the verifier black-box 130 over the network. In some embodiments the application back-end and the verifier black-box communicate over the same network that connects the device to the application back-end and the verifier black-box, while in other embodiments they communicate over a separate network such as a private network, and in yet other embodiments they are implemented by software running on the same machine.

Within the device 110 the application front-end and the prover black-box communicate with each other by exchanging messages.

In one embodiment the computing device 110 is a mobile device equipped with the iOS operating system, the prover black-box 120 and the application front-end 150 are separate iOS apps, and messages exchanged between the prover black-box and the application front-end are implemented as "URLs with custom schemes," as explained in the sections entitled "Communicating with Other Apps" and "Implementing Custom URL Schemes" of the "iOS App Programming Guide".

(The terms "iOS app" and "Android app" are used herein, with their usual meanings, to refer to computer programs running on computing devices equipped with the iOS and Android operating systems respectively. The unabbreviated term "application," on the other hand, is used more broadly to refer to a computer program that may be distributed over multiple computers. For example, an application may have a front-end component running on a mobile device and a back-end component running on a server connected to the device over a network. Different components of an application may be developed and deployed by different organizations.)

In one embodiment the computing device 110 is a mobile device equipped with the Android operating system, the prover block-box 120 and the application front-end 150 are separate Android apps, and messages exchanged between the prover black-box and the application front-end are implemented as "Intent objects" as explained in the Android API Guide entitled "Intents and Intent Filters". In an alternative embodiment the computing device 110 is also equipped with the Android operating system, and the messages exchanged between the prover black-box and the application front-end are also implemented as "Intent objects", but the prover black-box and the application front-end are parts of the same Android app, each comprising one or more "components" of the app.

In one embodiment the prover black-box 120 is a software library linked to the application front-end, messages from the application front-end 150 to the prover black-box being implemented as Application Programming Interface (API) function calls, and messages from the prover black-box to the application front-end as callbacks.

Figure 1A:
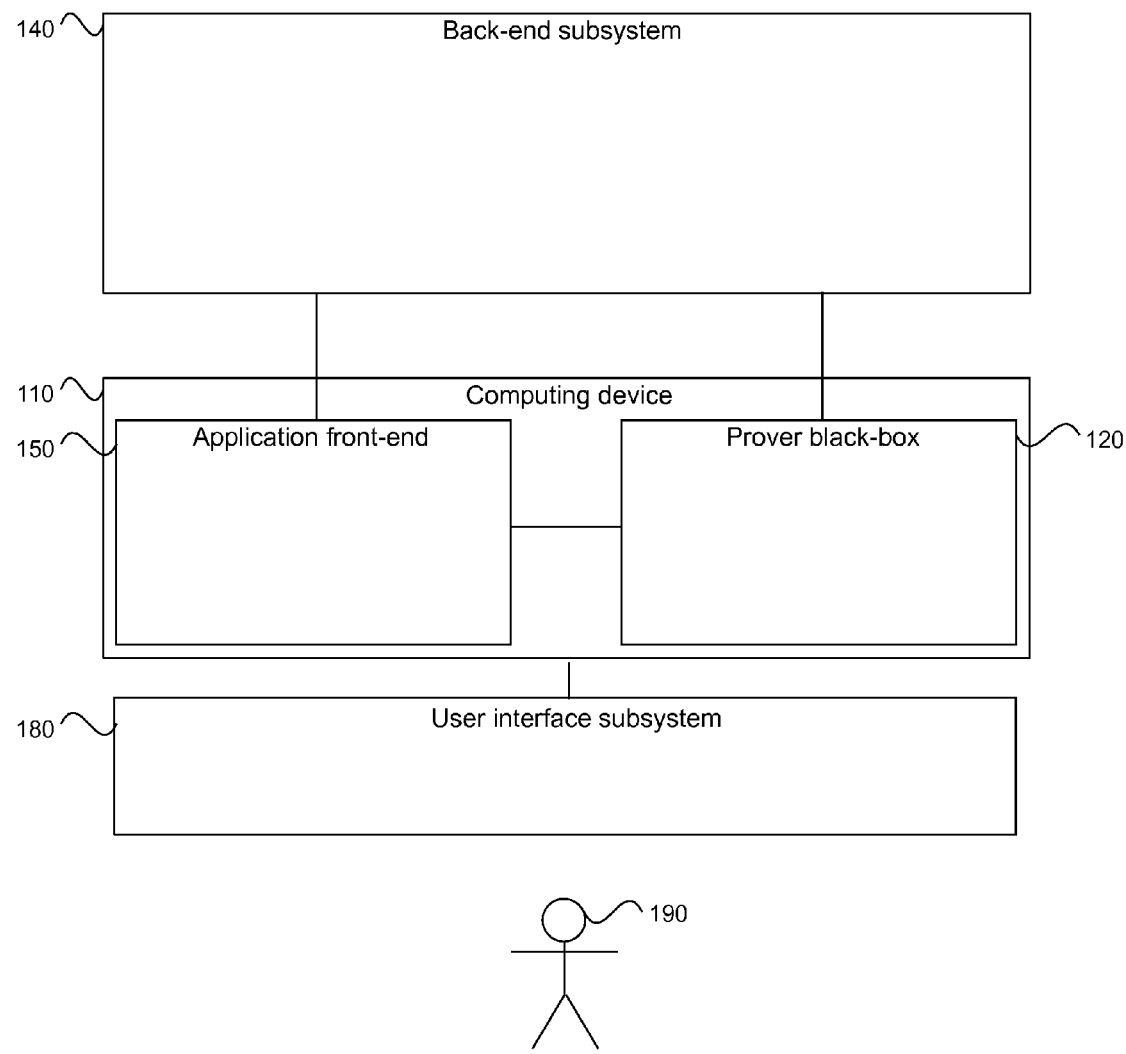
FIG. 1A is a block diagram illustrating embodiments that feature a prover black-box but no verifier black-box.

FIG. 1A illustrates embodiments that feature a prover black-box 120 but no verifier black-box. The functionality of verifying possession of cryptographic credentials exists in the back-end subsystem 140 but is not encapsulated in a verifier black-box. No distinction is made within the back-end subsystem 140 between an application back-end and a verifier black-box.

Figure 1B:
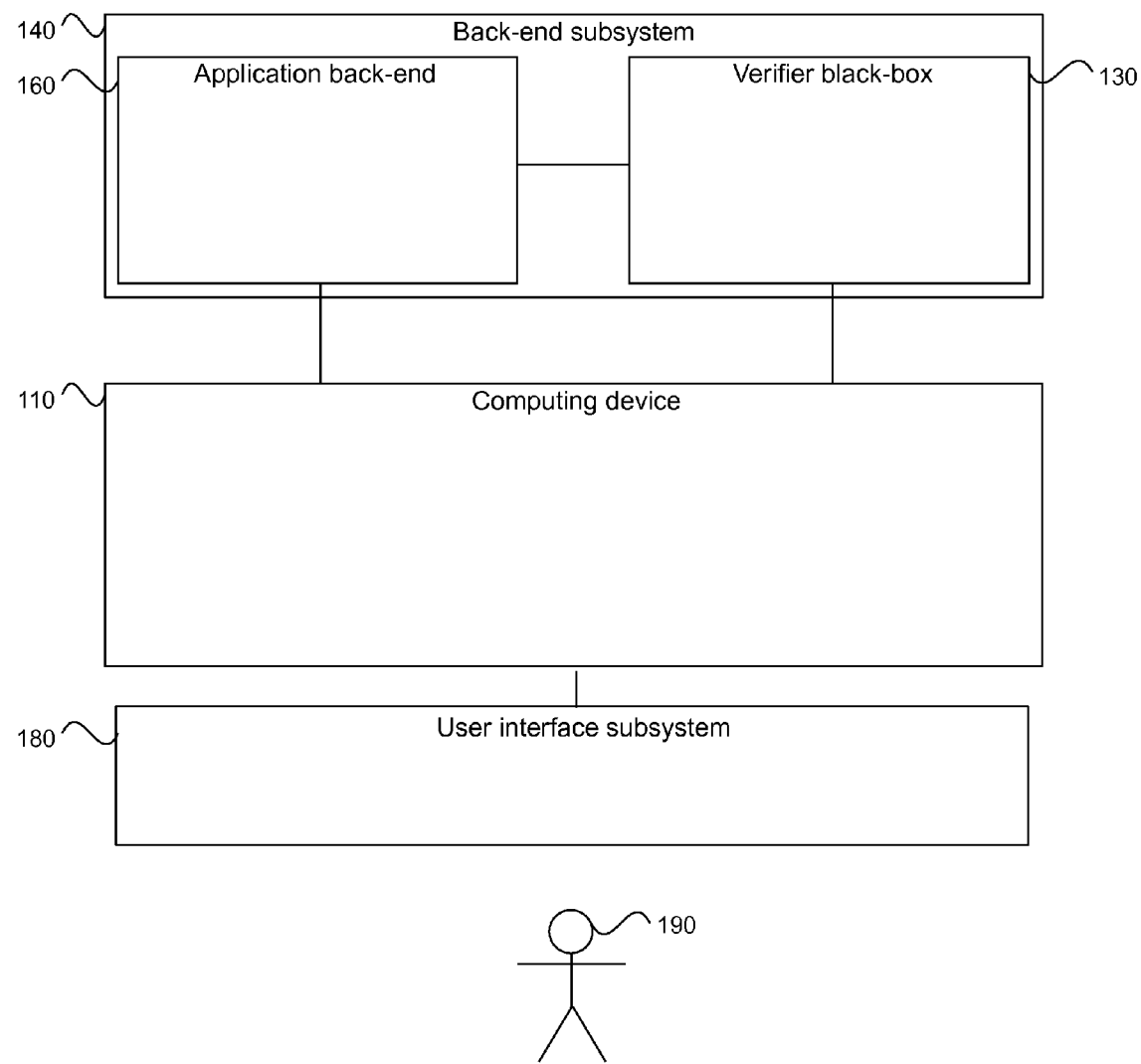
FIG. 1B is a block diagram illustrating embodiments that feature a verifier black-box but no prover black-box.

FIG. 1B illustrates embodiments that feature a verifier black-box but no prover black-box. The functionality of proving possession of cryptographic credentials exists in the device 110 but is not encapsulated in a prover black-box. No distinction is made within the device 110 between an application front-end and a prover black-box.

Figure 2:
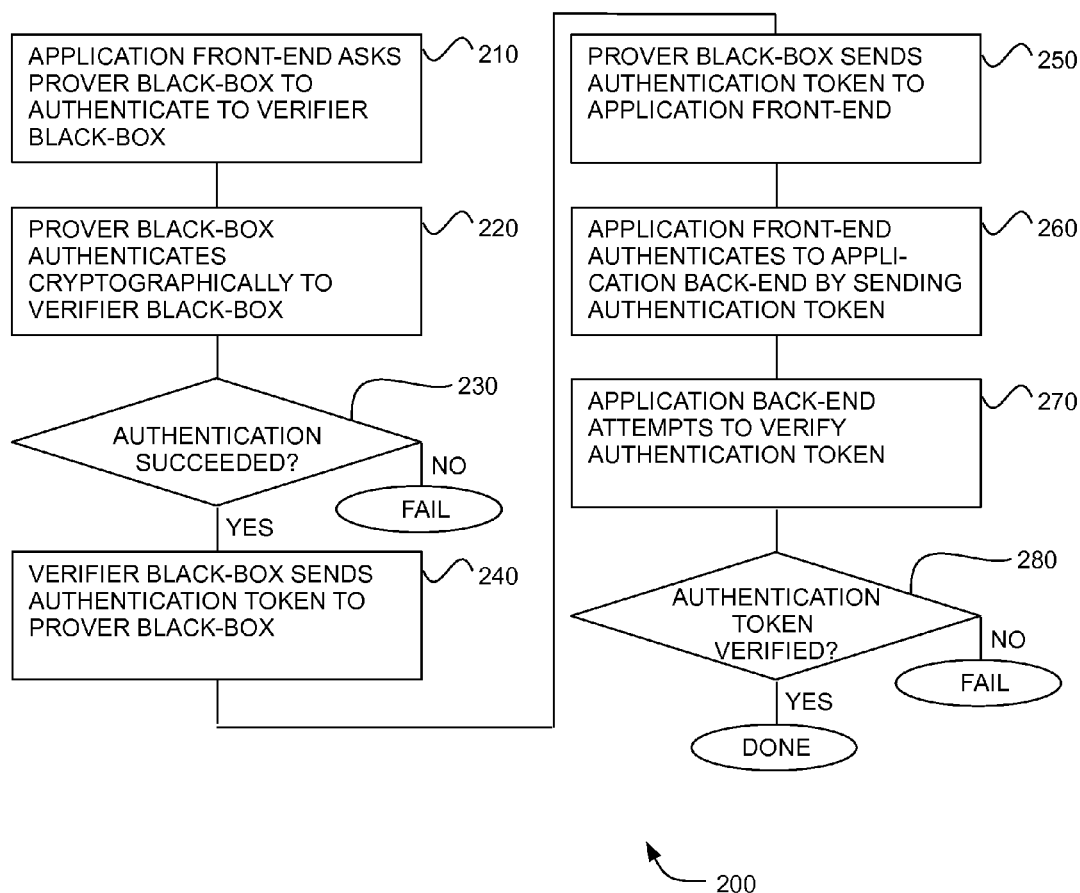
FIG. 2 is a flow diagram illustrating a process for authenticating a computing device using a prover black-box and a verifier black-box.

FIG. 2 is a flow diagram that generally illustrates a process 200 followed by system 100 for authenticating the computing device 110 to the back-end subsystem 140.

At 210 the application front-end 150 asks the prover black-box 120 to authenticate cryptographically to the verifier black-box 130.

At 220 the prover black-box authenticates cryptographically to the verifier black-box 130 by proving possession of one or more cryptographic credentials. Then the process continues at 230.

At 230 the process fails if cryptographic authentication failed at 220. Otherwise the process continues at 240.

At 240 the verifier black-box sends to the prover black-box an authentication token providing verifiable confirmation of the cryptographic authentication. Then the process continues at 250.

At 250, the prover black-box sends the authentication token to the application front-end. Then the process continues at 260.

At 260 the application front-end authenticates to the application back-end 160 by sending the authentication token. Then the process continues at 270.

At 270 the application back-end attempts to verify the authentication token as being confirmation of a cryptographic authentication. Then the process continues at 280.

At 280 the process succeeds if the authentication token was verified. Otherwise the process fails.

Thus application-specific functionality is embodied in the application front-end and the application back-end, which are developed by developers skilled in the art of application development, whereas cryptographic authentication functionality is encapsulated in the prover black-box and the verifier black-box, which are developed by developers skilled in the art of cryptographic protocol development, and which are made available for use by any number of different applications. This allows application developers to implement cryptographic authentication easily by making use of pre-existing prover and verifier black-boxes.

Figure 2A:
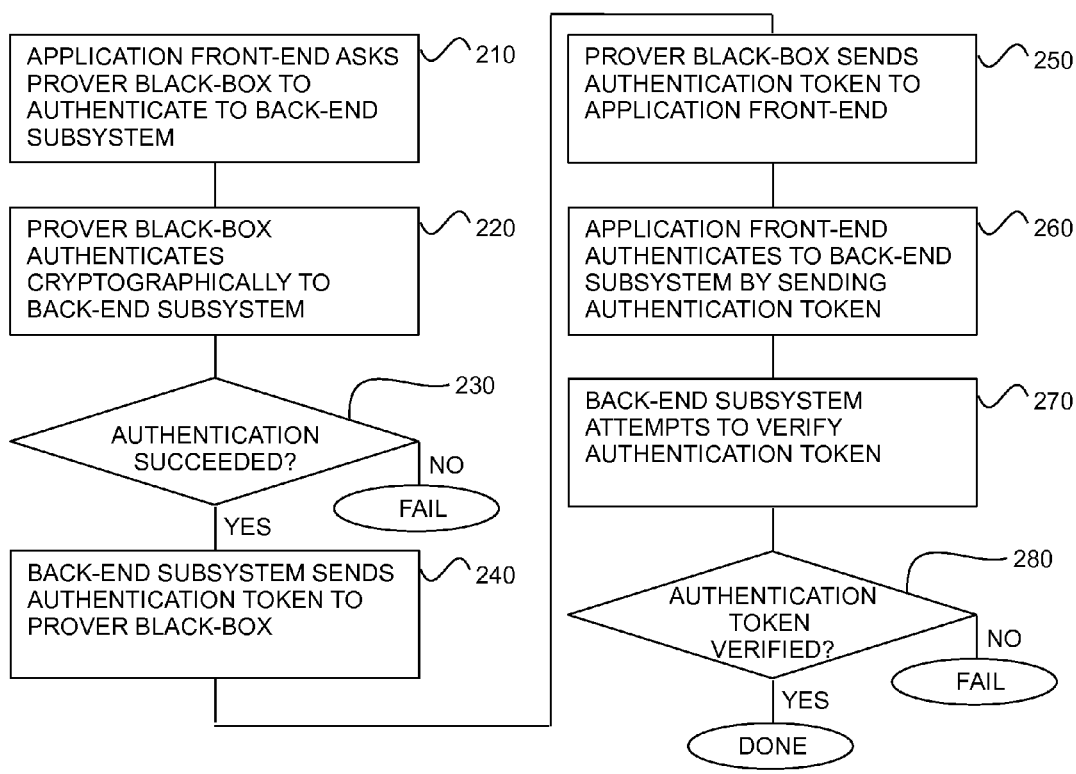
FIG. 2A is a flow diagram illustrating a process for authenticating a computing device using a prover black-box.

FIG. 2A illustrates a process followed by embodiments illustrated in FIG. 1A for authenticating the computing device 110 to the back-end subsystem. FIG. 2A differs from FIG. 2 in that the back-end subsystem plays in FIG. 2A the roles played by the application back-end and the verifier black-box in FIG. 2.

Figure 2B:
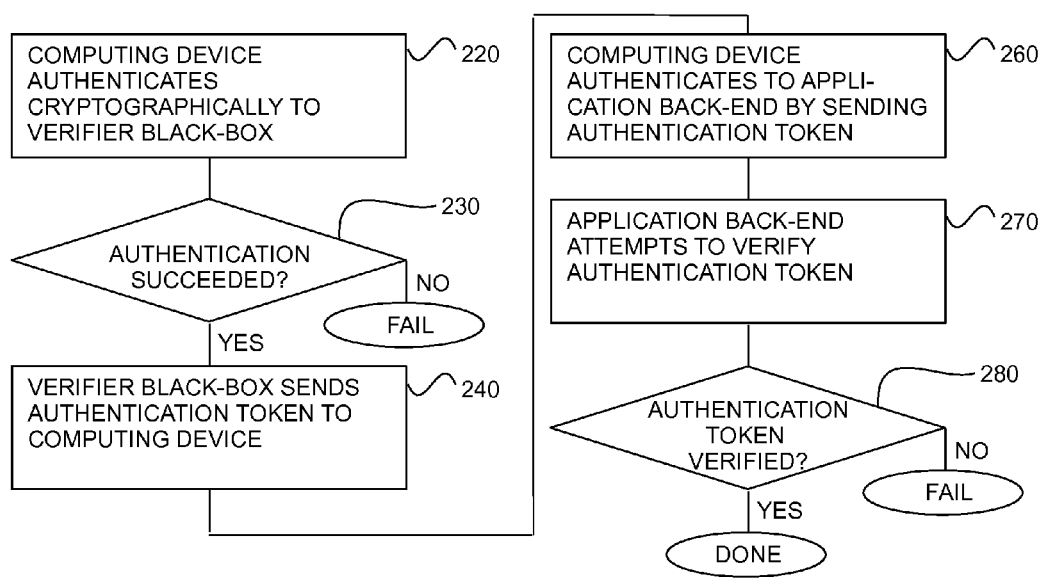
FIG. 2B is a flow diagram illustrating a process for authenticating a computing device using a verifier black-box.

FIG. 2B illustrates a process followed by embodiments illustrated in FIG. 1B for authenticating the computing device to the back-end subsystem 140. FIG. 2B differs from FIG. 2 in that steps 210 and 250 are omitted and the computing device plays in FIG. 2B the roles played by the application front-end and the prover black-box in FIG. 2.

Figure 3:
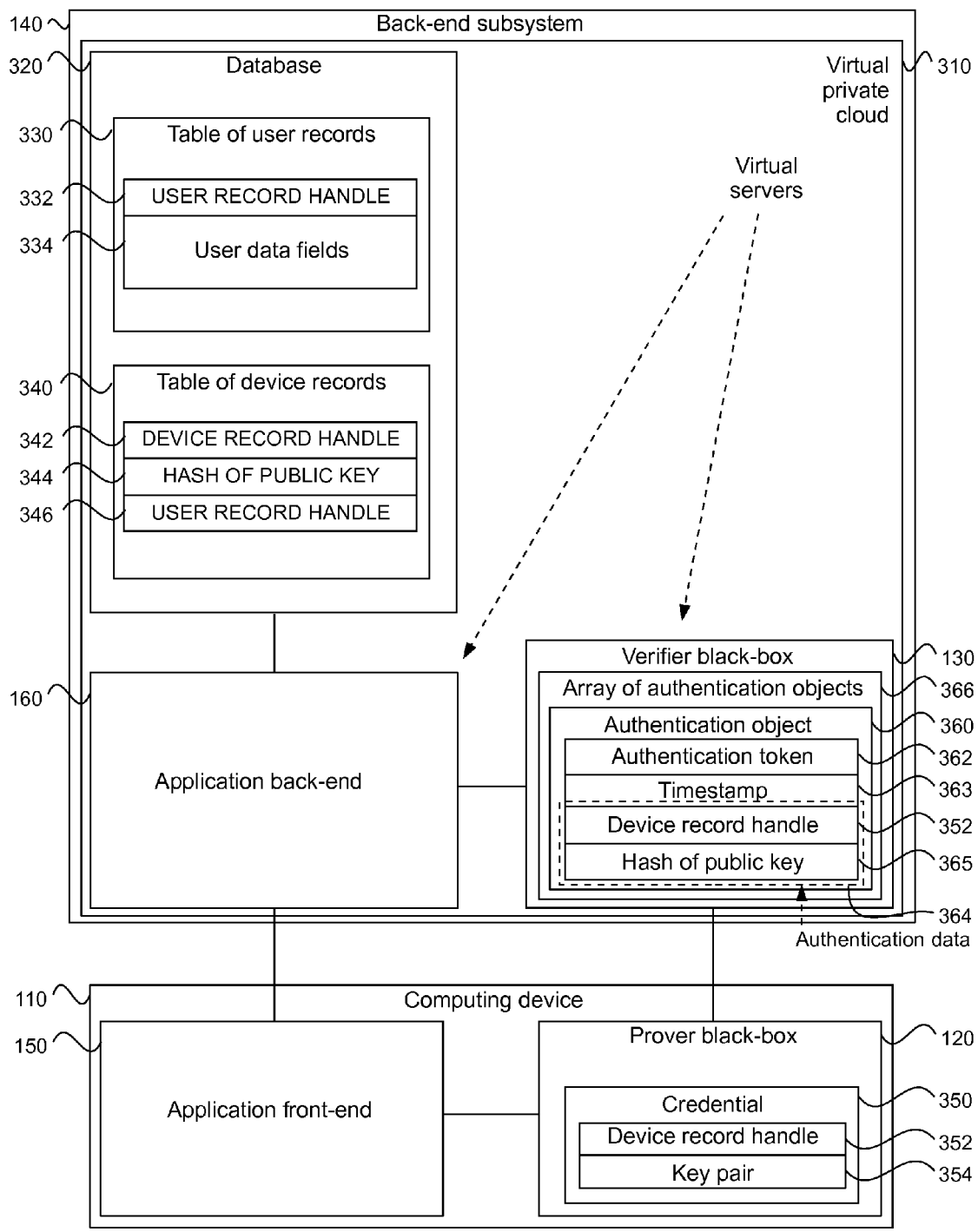
FIG. 3 is a block diagram illustrating embodiments where the verifier black-box is a virtual appliance.

FIG. 3 is a block diagram illustrating embodiments where the prover black-box 120 uses a key pair for cryptographic authentication to the verifier black-box 130 and the verifier black-box is a virtual appliance, i.e. a virtual server pre-configured as a generic verifier black-box, whose functionality is not specific to a particular application.

In one embodiment the verifier black-box 130 and the application back-end 160 are virtual servers known as Elastic Computing Cloud EC2 machine instances, made available for rent by the hour by Amazon Web Services (AWS), and located within a Virtual Private Cloud (VPC) 310 internal to the back-end subsystem 140, so that they communicate securely over a virtual private network. The verifier black-box virtual server is pre-configured by developers skilled in the art of implementing cryptographic protocols, and made available as a virtual appliance on the AWS Marketplace. The application back-end virtual server has access to a relational database 320 provided by the AWS Relational Database Service (RDS).

(The term "appliance" is to be understood as referring to a physical or virtual machine that has been pre-configured as a black-box dedicated to a specific purpose and made generally available for use by applications to that purpose.)

The database 320 comprises a table of user records 330 and a table of device records 340. Each user record corresponds to an application user, and comprises a USER RECORD HANDLE field 332 that uniquely identifies the record within the table, as well as a collection of fields 334 containing user data. Each user record is indexed by the value of the USER RECORD HANDLE field 332 for efficient retrieval of the record given that value. Each device record corresponds to a device that an application user has registered for use with the application, and comprises a DEVICE RECORD HANDLE field 342 that uniquely identifies the record, a HASH OF PUBLIC KEY field 344, and a USER RECORD HANDLE field 346. The value of the USER RECORD HANDLE field 346 refers to the user record for the user who registered the device. Each device record is indexed by the value of the DEVICE RECORD HANDLE field 342 for efficient retrieval of the record given that value.

(The term "handle" is used herein as a synonym for the term "primary key" of database terminology, to avoid confusion between database keys and cryptographic keys. Names of record fields are herein written in uppercase. Fields 332 are 342 are different fields of different records, which have the same name "USER RECORD HANDLE".)

The prover black-box 120 has a credential 350 comprising a device record handle 352 and a key pair 354 pertaining to a digital signature public key cryptosystem such as one of the public key cryptosystems, DSA, ECDSA or RSA, specified in the Digital Signature Standard (DSS), publication FIPS PUB 186-4 of the National Institute of Standards and Technology (NIST). The device record handle identifies a device record in the database 320 that contains the handle as the value of the DEVICE RECORD HANDLE field 342. That record is the one corresponding to computing device 110, and it contains a hash of the public key portion of the key pair 354 as the value of the HASH OF PUBLIC KEY field 344.

(The key pair 354 consists of a collection of cryptographic parameters. In preferred embodiments, the "private key" and "public key" comprise all the key pair parameters needed to sign and verify a signature, respectively. For example, in such embodiments with the notations of Section 4.1 of the DSS, a DSA key pair consists of the parameters p, q, g, x and y. The private key is (p,q,g,x) and the public key is (p,q,g,y). By contrast, the DSS does not consider "domain parameters" as being part of the private and public keys. For example, in the case of the DSA cryptosystem, the DSS refers to x as the private key and y as the public key, omitting the domain parameters p, q and g.

Figure 4:
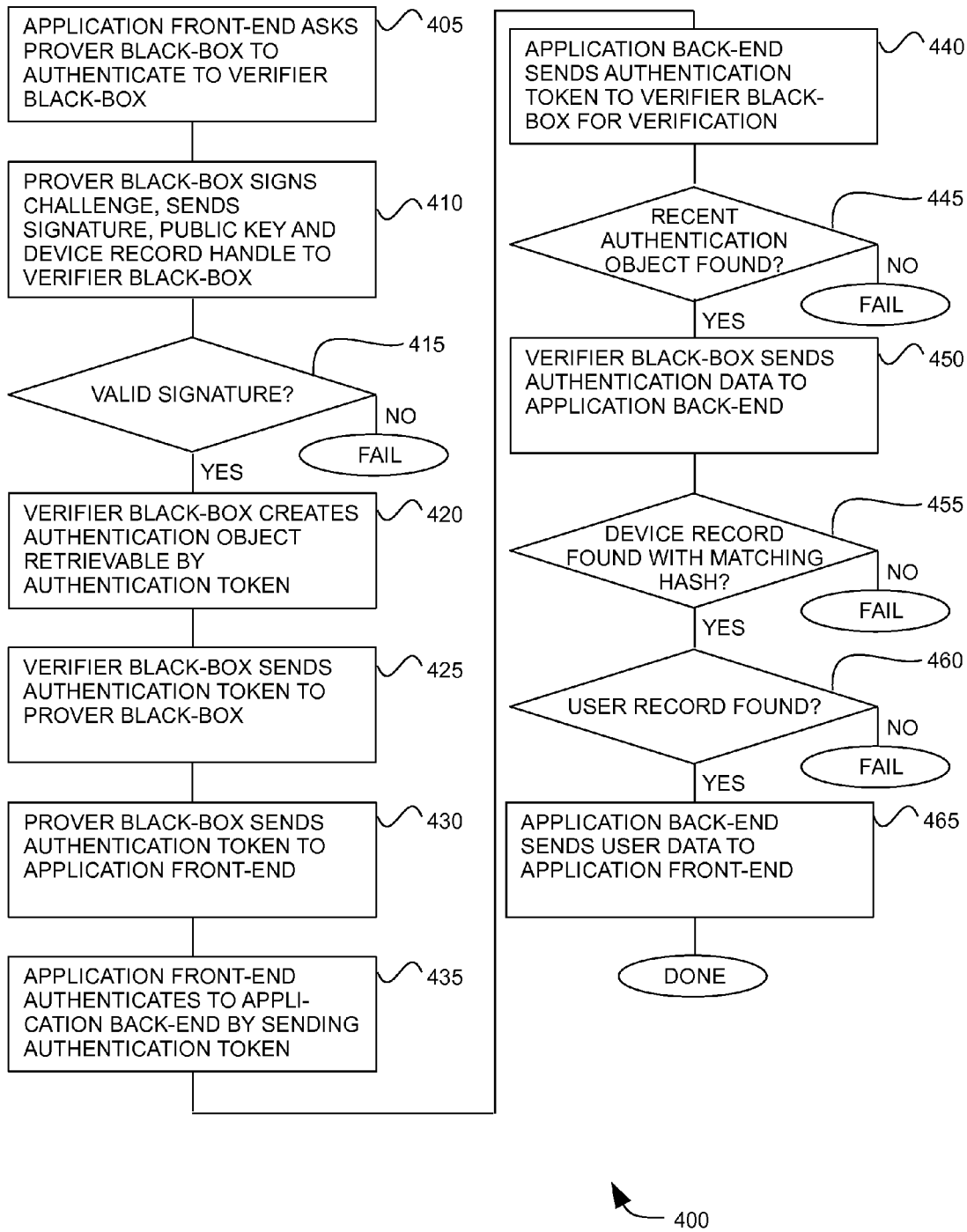
FIG. 4 is a flow diagram illustrating a process for authenticating a computing device using an authentication token that uniquely identifies an authentication object comprising authentication data.

FIG. 4 is a flow diagram illustrating an authentication process 400 followed by embodiments illustrated in FIG. 3.

At 405 the application front-end 150 sends a message to the prover black-box 120 asking it to authenticate cryptographically to the verifier black-box 130. Then the process continues at 410.

At 410 the prover black-box authenticates cryptographically to the verifier black-box. To that purpose it establishes a TLS connection to a cryptographic authentication endpoint of the verifier black-box. (The acronym TLS refers to the Transport Layer Security protocol of the Internet Engineering Task Force, which is a successor to the Secure Sockets Layer protocol.) During the TLS handshake, the verifier black-box authenticates to the prover black-box by sending a TLS server certificate and proving knowledge of the corresponding private key. After the TLS connection has been established, the verifier black-box sends a random high-entropy nonce to the prover black-box over the TLS connection. The verifier black-box and the prover black-box separately construct a challenge by computing a cryptographic hash of the nonce and the TLS server certificate. The prover black-box signs the challenge using the private key that is part of the key pair 354, and sends the signature, the public key that is part of the key pair, and the device record handle 352 to the verifier black-box over the TLS connection; by signing the challenge, the prover black-box proves knowledge of the private key; by sending the device record handle and proving knowledge of the private key the prover black-box proves possession of the credential 350. Then the process continues at 415.

(A nonce is a random string that is only used once. The term "random string" is meant to encompass both a truly random string, and a string generated by a pseudo-random string generator or an entropy accumulator such as the /dev/urandom facility of Linux and other Unix systems. "High entropy" refers to an entropy that is high enough for the security objectives of a particular embodiment. In one embodiment all high-entropy random strings have at least 256 bits of entropy.)

At 415 the verifier black-box verifies the signature using the public key that is part of the key pair. If the verification of the signature succeeds, cryptographic authentication is successful and the process continues at 420. Otherwise the process fails.

At 420 the verifier black-box creates an authentication object 360, shown in FIG. 3, containing an authentication token 362, a timestamp 363 and authentication data 364. The authentication token is generated by the verifier black-box as a high-entropy random string. The authentication data comprises the device record handle 352 received from the prover black-box at step 410 and a cryptographic hash 365 computed by applying a cryptographic hash function to the public key also received at step 410. In one embodiment the cryptographic hash function is the hash function SHA-1 specified in the Secure Hash Standard (SHS), published by NIST as FIPS PUB 180-4; in alternative embodiments it is one of the other hash functions specified in the SHS. The authentication object is an element of an array 366 of such authentication objects. Since the authentication token is a high-entropy random string, the authentication object is uniquely identified with high probability by the authentication token, and hence is retrievable by the authentication token. In one embodiment the array of objects 366 is stored in shared memory allocated in the verifier black-box virtual server 130; in an alternative embodiment the array of authentication objects is implemented as a table of authentication records within a relational database internal to the verifier black-box virtual server, each authentication object being referred to as an authentication record and being indexed by the authentication token. Then the process continues at 425.

At 425 the verifier black-box sends the authentication token to the prover black-box over the TLS connection established at step 410, as confirmation that cryptographic authentication was successful at 410. This confirmation is verifiable by using the authentication token to retrieve the authentication object 360 created at 420 (as is done at step 445). Then the process continues at 430.

At 430 the prover black-box sends a message to the application front-end containing the authentication token. Then the process continues at 435.

At 435 the application front-end authenticates to the application back-end 160 by sending the authentication token over a TLS connection. Then the process continues at 440.

At 440 the application back-end sends the authentication token to an authentication data retrieval endpoint of the verifier black-box for verification, over the virtual private network provided by the VPC 310. Then the process continues at 445.

At 445 the verifier black-box attempts to retrieve an authentication object 360 containing the authentication token received at step 440 and being recent enough, i.e. having an age, determined by the timestamp 363, that is less than an age limit set by a security policy. If there is no such object, the process fails. Otherwise the authentication token is deemed to have been verified as a confirmation of the cryptographic authentication that resulted in the creation of the object, and the process continues at 450.

At 450 the verifier black-box sends the authentication data contained in the authentication object to the application back-end over the virtual private network. The authentication data comprises the device record handle 352 and the public key hash 365. Then the process continues at 455.

At 455 the application back-end looks in the database 320 for a device record containing the device record handle 352 in the DEVICE RECORD HANDLE field 342 and the public key hash 365 in the HASH OF PUBLIC KEY field 344. If no such record is found, the process fails. Otherwise the process continues at 460.

At 460 the application back-end looks in the database 320 for a user record whose USER RECORD HANDLE field 332 has the same value as the USER RECORD HANDLE field 346 of the device record found at step 455. If no such record is found, the process fails. Otherwise the process continues at 465.

At 465 the application back-end sends user data contained in the user data fields 334 of the user record found at step 460 to the application front-end over the same TLS connection used at step 435. Then the process terminates successfully: the device has been successfully authenticated to the application back-end as being the device corresponding to the device record found at step 455, owned by the user corresponding to the user record found at step 460.

In one embodiment, steps 455 and 460 are combined and implemented together using a join of the table of device records 340 and the table of user records 330, in a manner well known to developers skilled in the art of relational database query processing.

Figure 5:
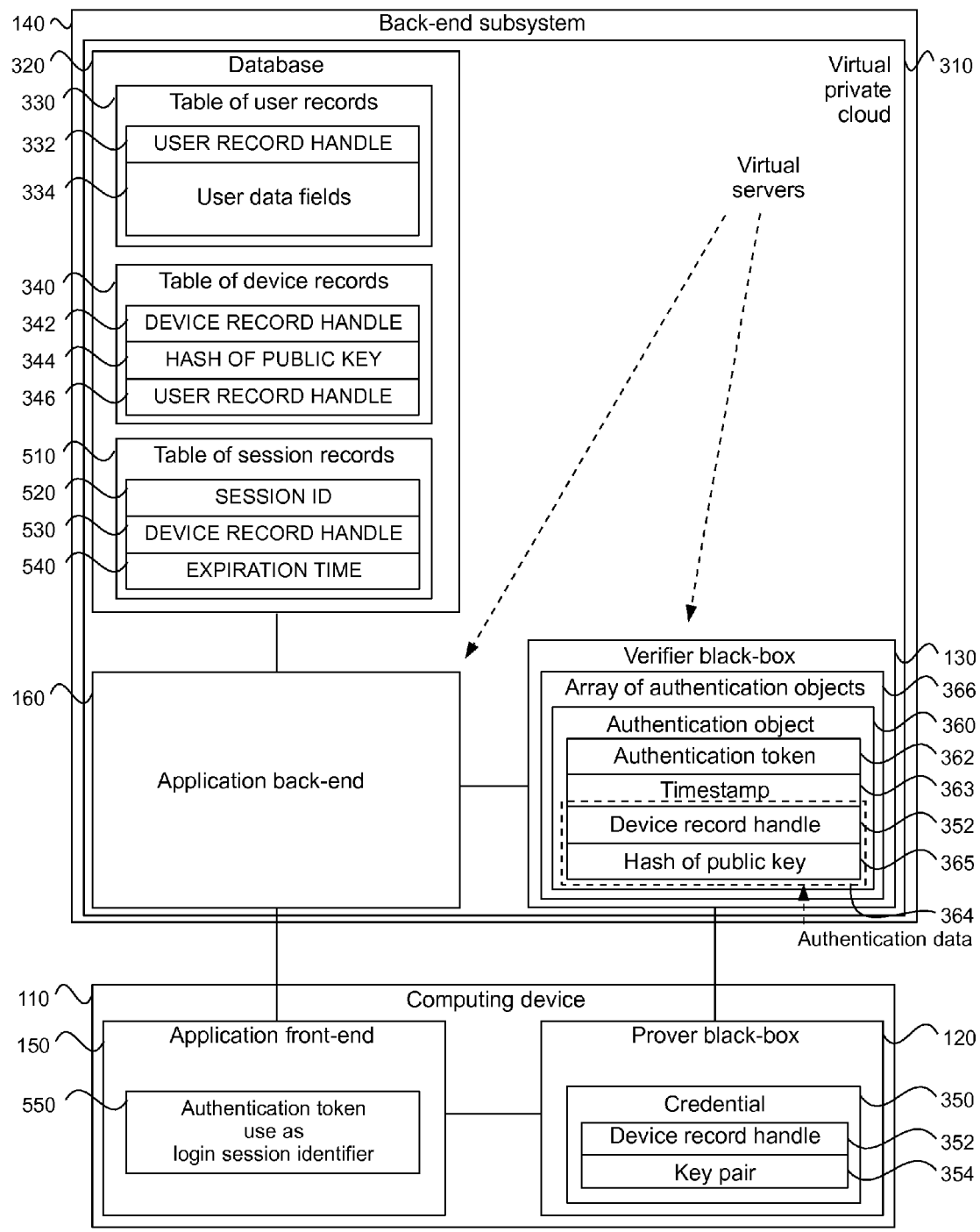
FIG. 5 is a block diagram illustrating embodiments where the authentication token is used as a login session identifier.

FIG. 5 is a block diagram illustrating embodiments where the authentication token is used repeatedly by the application front-end 150 as a login session identifier for intra-session authentication to the application back-end 160 while a login session is in progress, following an initial cryptographic authentication. The database 320 comprises a table of login session records 510. Each login session record represents a login session and comprises a SESSION ID field 520 that uniquely identifies the record, a DEVICE RECORD HANDLE field 530 that refers to a device record, and an EXPIRATION TIME field 540 that specifies a time at which the login session will expire. Each login session record is indexed by the value of the SESSION ID field 520 for efficient retrieval of the record given that value. Upon initial cryptographic authentication, a login session record is created and the authentication token is stored in the record as the value of the SESSION ID field. The authentication token is also stored by the application front-end in a memory location 550 for use as a login session identifier.

Figure 6:
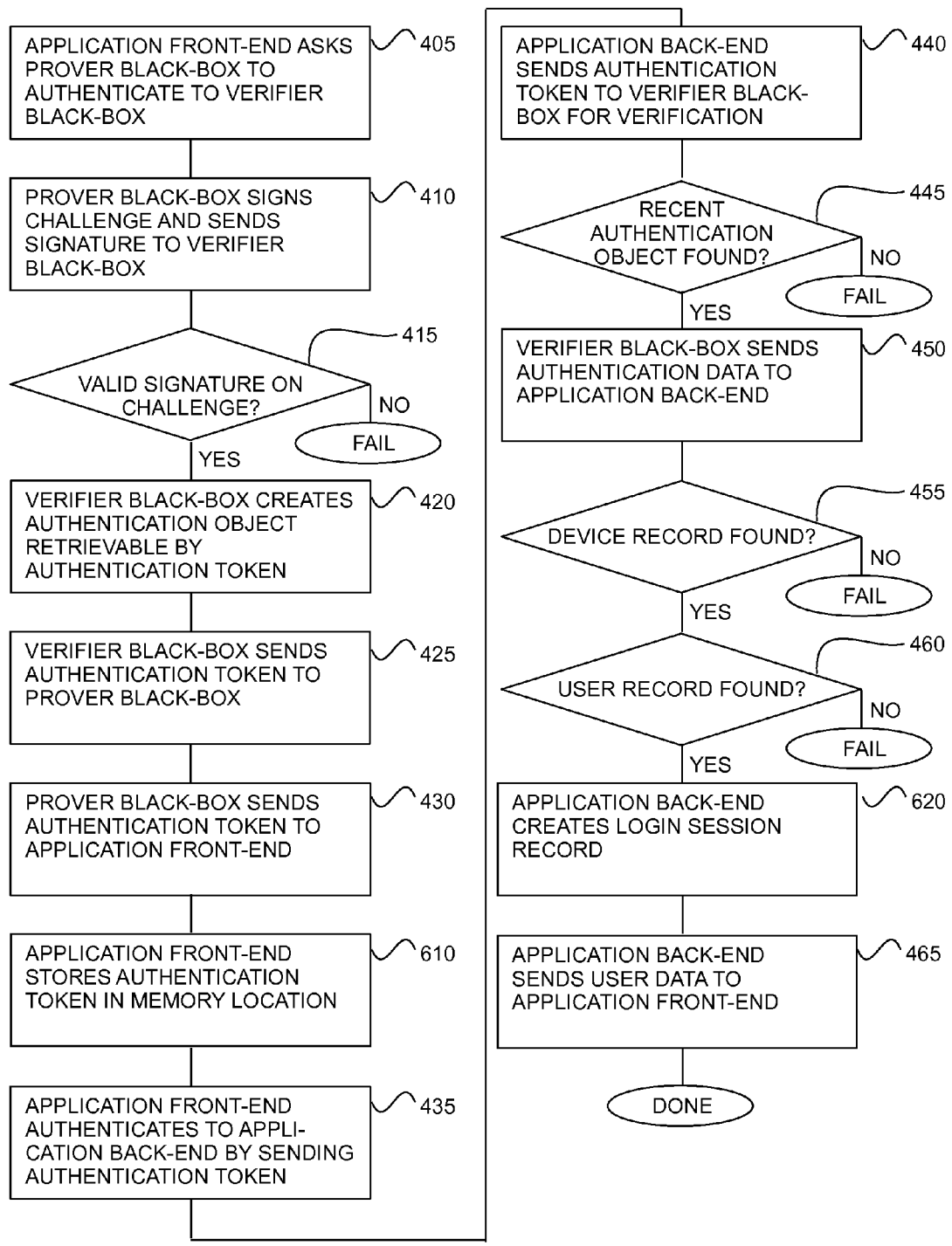
FIG. 6 is a flow diagram illustrating a process that creates a session record upon successful cryptographic authentication.

FIG. 6 is a flow diagram illustrating an extension of the authentication process 400, followed by embodiments illustrated in FIG. 5, to accommodate the creation of a session record upon successful cryptographic authentication. Two additional steps are inserted into the process 400. Step 610 is inserted between steps 430 and 435 and step 620 between steps 460 and 465.

At 610 the application front-end 150 stores a copy of the authentication token, received at step 430, in the memory location 550, before forwarding it to the application back-end at step 435.

At 620 the application back-end 160 creates a login session record in the table of login session records 510, comprising the authentication token, received at step 430, as the value of the SESSION ID field 520, the device record handle, contained in the authentication data received at step 450, as the value of the DEVICE RECORD HANDLE field 530, and an expiration time as the value of the EXPIRATION TIME field 540.

Figure 7:
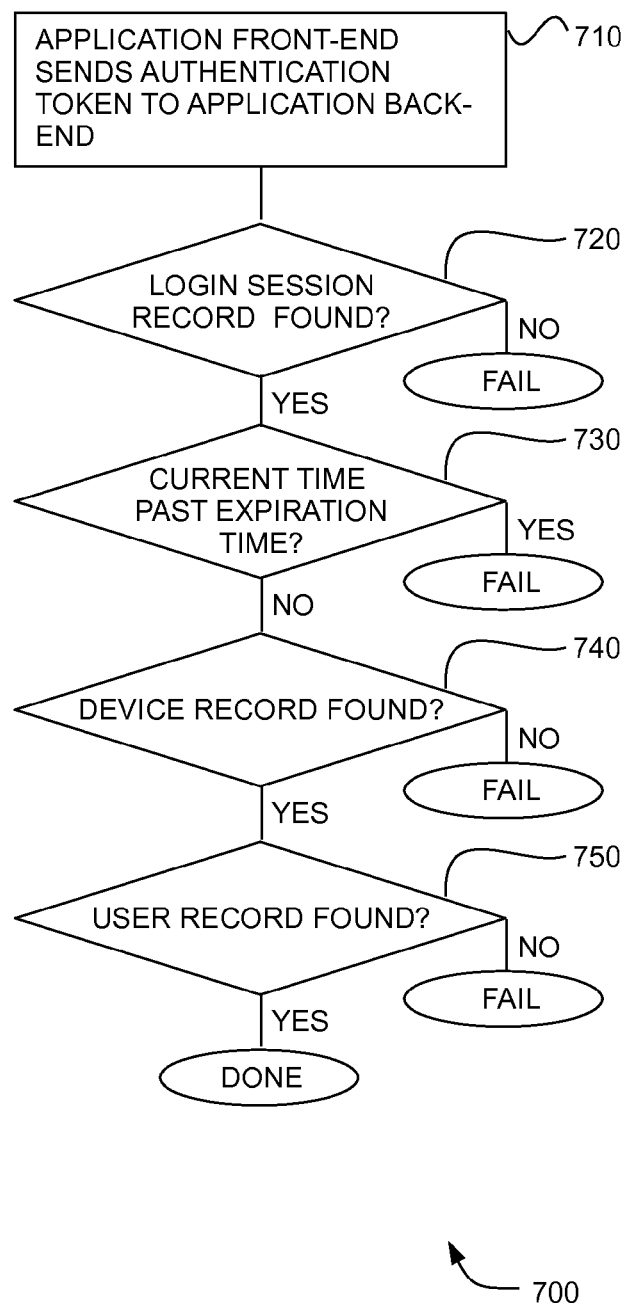
FIG. 7 is a flow diagram illustrating a process for using an authentication token as a login session identifier.

FIG. 7 is a flow diagram illustrating a process 700, followed by embodiments illustrated in FIG. 5, to use an authentication token as a login session identifier.

At 710 the application front-end 150 sends the authentication token stored in the memory location 550 to the application back-end 160 over a TLS connection. Then the process continues at 720.

At 720 the application back-end looks in the database 320 for a login session record where the value of the SESSION ID field 520 is the authentication token. If no such record is found, the process fails. Otherwise the process continues at 730.

At 730 the application back-end checks if the current time is past the expiration time specified by the EXPIRATION TIME field of the login session record found at step 720. If so, the process fails. Otherwise the process continues at 740.

At 740 the application back-end looks in the database 320 for a device record whose DEVICE RECORD HANDLE field 342 that has the same value as the DEVICE RECORD HANDLE field 530 of the login session record found at step 720. If no such record is found, the process fails. Otherwise the process continues at 750.

At 750 the application back-end looks in the database 320 for a user record whose USER RECORD HANDLE field 332 that has the same value as the USER RECORD HANDLE field 346 of the device record found at step 740. If no such record is found, the process fails. Otherwise the process terminates successfully: the device has been successfully authenticated to the application back-end as being the device corresponding to the device record found at step 740, owned by the user corresponding to the user record found at step 750.

In one embodiment, steps 720, 730, 740 and 750 are combined and implemented together using a join of the table of login session records 510, the table of device records 340 and the table of user records 330, in a manner well known to developers skilled in the art of relational database query processing.

Figure 8:
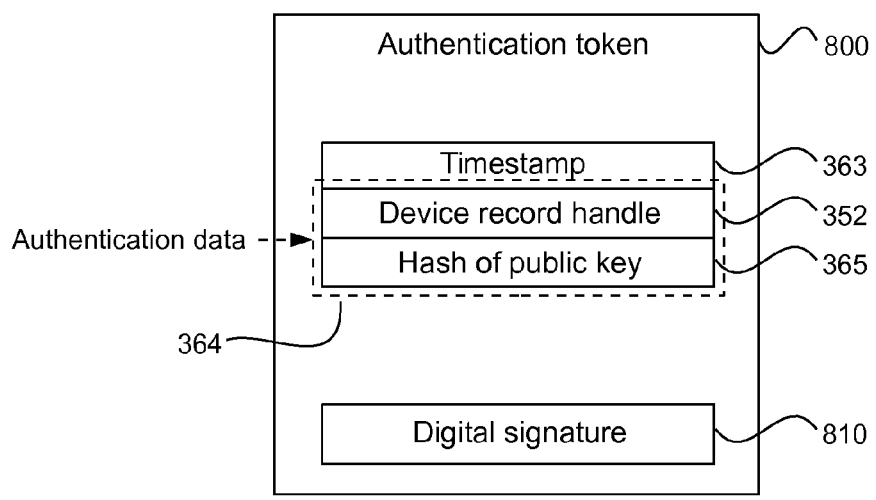
FIG. 8 is a block diagram illustrating an authentication token comprising signed authentication data.

FIG. 8 is a block diagram illustrating an authentication token 800 that comprises digitally signed authentication data. Instead of uniquely identifying an authentication object 360 that comprises authentication data 364 including the device record handle 352 and the public key hash 365, the authentication token itself comprises the authentication data 364 with the device record handle 352 and the public key hash 365, a creation timestamp 363, and a signature 810 computed by the verifier black-box 130 on the authentication data and the timestamp.

Figure 9:
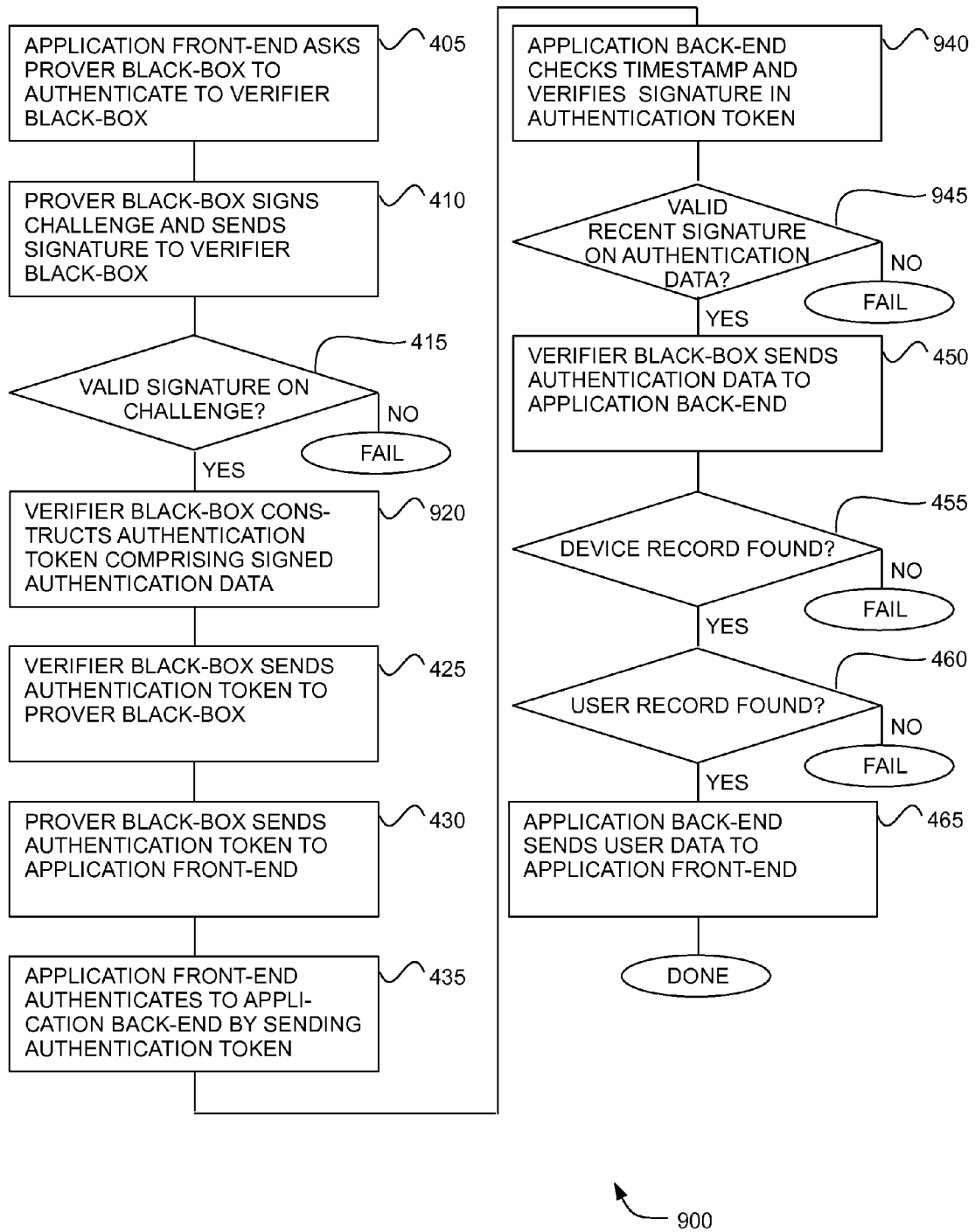
FIG. 9 is a flow diagram illustrating a process for authenticating a computing device using an authentication token comprising signed authentication data.

FIG. 9 is a flow diagram illustrating a process 900 for authenticating a computing device using an authentication token comprising signed authentication data. Embodiments using process 900 are illustrated in FIG. 3, except that the verifier black-box 130 does not use an array 366 of authentication objects.

The process 900 is a modification of the process 400 of FIG. 4. Steps 420, 440 and 445 are replaced by steps 920, 940 and 945 respectively.

At 920 the verifier black-box constructs authentication data 364 as at step 420 of process 400. But instead of storing the data in an authentication object, it creates the authentication token 800 comprising the authentication data 364, a creation timestamp 363, and a signature on the authentication data and the timestamp. In one embodiment the signature is computed using a private key pertaining to a digital signature public key cryptosystem such as those specified in the DSS (DSA, ECDSA or RSA).

At 940, instead of sending the authentication token to the verifier black-box for verification as at step 440 of process 400, the application back-end checks that the timestamp 363 is not older than an age limit set by a security policy, and verifies the signature 810 using the public key associated with private key that the verifier black-box used to compute the signature at step 920.

At 945, the process fails if the verification of the signature failed at 940. Otherwise the process continues at 450.

Figure 10:
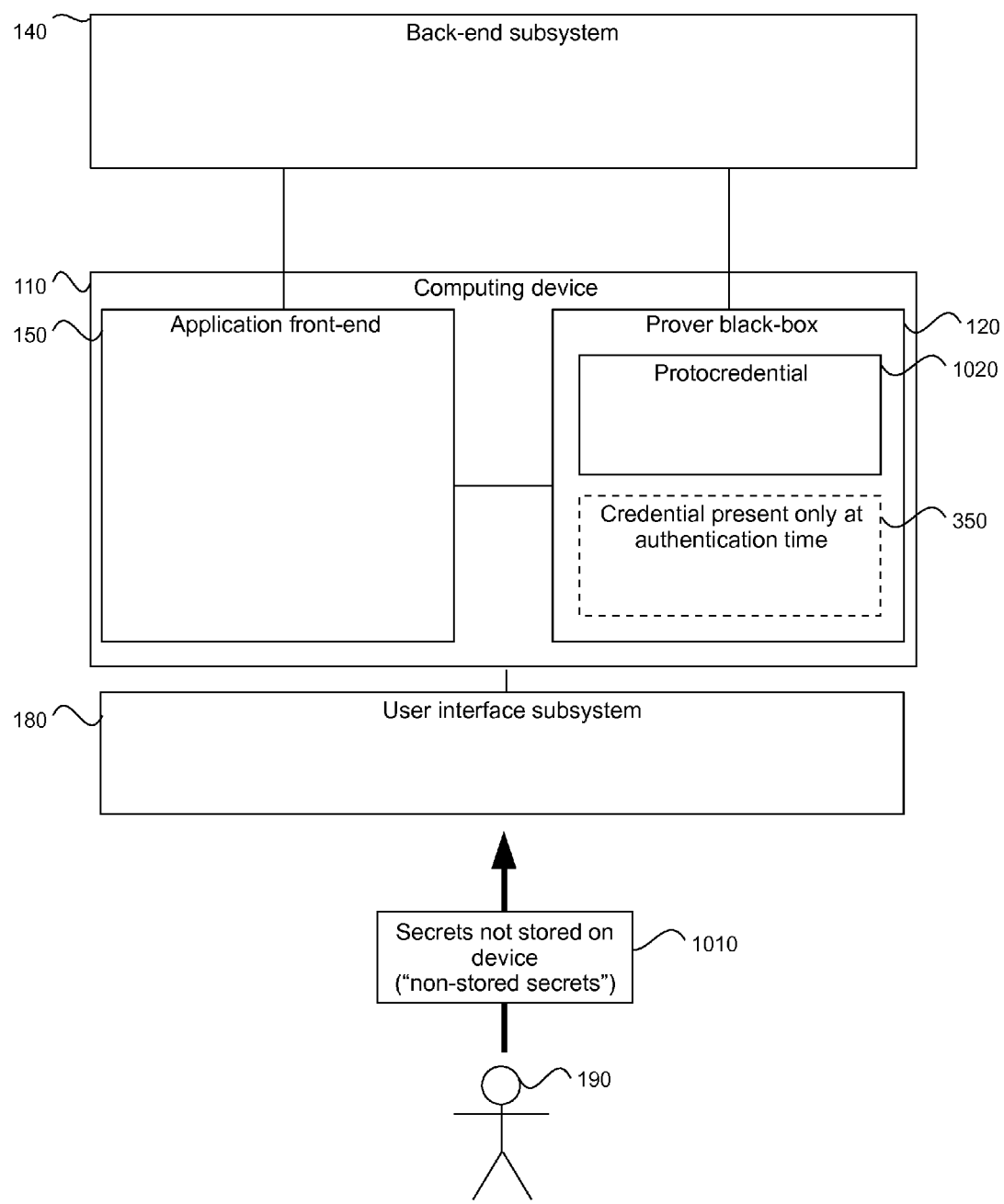
FIG. 10 is a block diagram illustrating a computing device containing a protocredential.

FIG. 10 is a block diagram illustrating the computing device 110 according to embodiments that protect the credential 350 against an attacker who may capture the device by keeping the credential stored in the computing device only while it is being used. The credential is created at registration time, i.e. when the user 190 registers the device, and then discarded. The credential is generated from one or more secrets 1010 not stored in the device ("non-stored secrets"), supplied by the user via user interface subsystem 180, such as a passcode or a biometric sample. (The term "passcode" is to be understood as referring to any secret code supplied by the user, such as a password, a passphrase, a personal identification number (PIN), a one-time password generated by a soft or hard token, a code derived from a selection of images by the user, etc.) A protocredential 1020 is also created at registration time, kept in the device, and used in conjunction with the non-stored secrets to regenerate the credential as needed. At authentication time the credential is regenerated, used, and erased again. (The term "protocredential" is herein defined as a collection of parameters that can be used to produce a credential when combined with one or more secrets not stored on the device.) The use of the non-stored secrets in addition to the protocredential, which contains a secret stored in the device, amounts to multifactor authentication, one authentication factor being possession of the device and additional authentication factors being the ability to supply each of the non-stored secrets.

Figure 11:
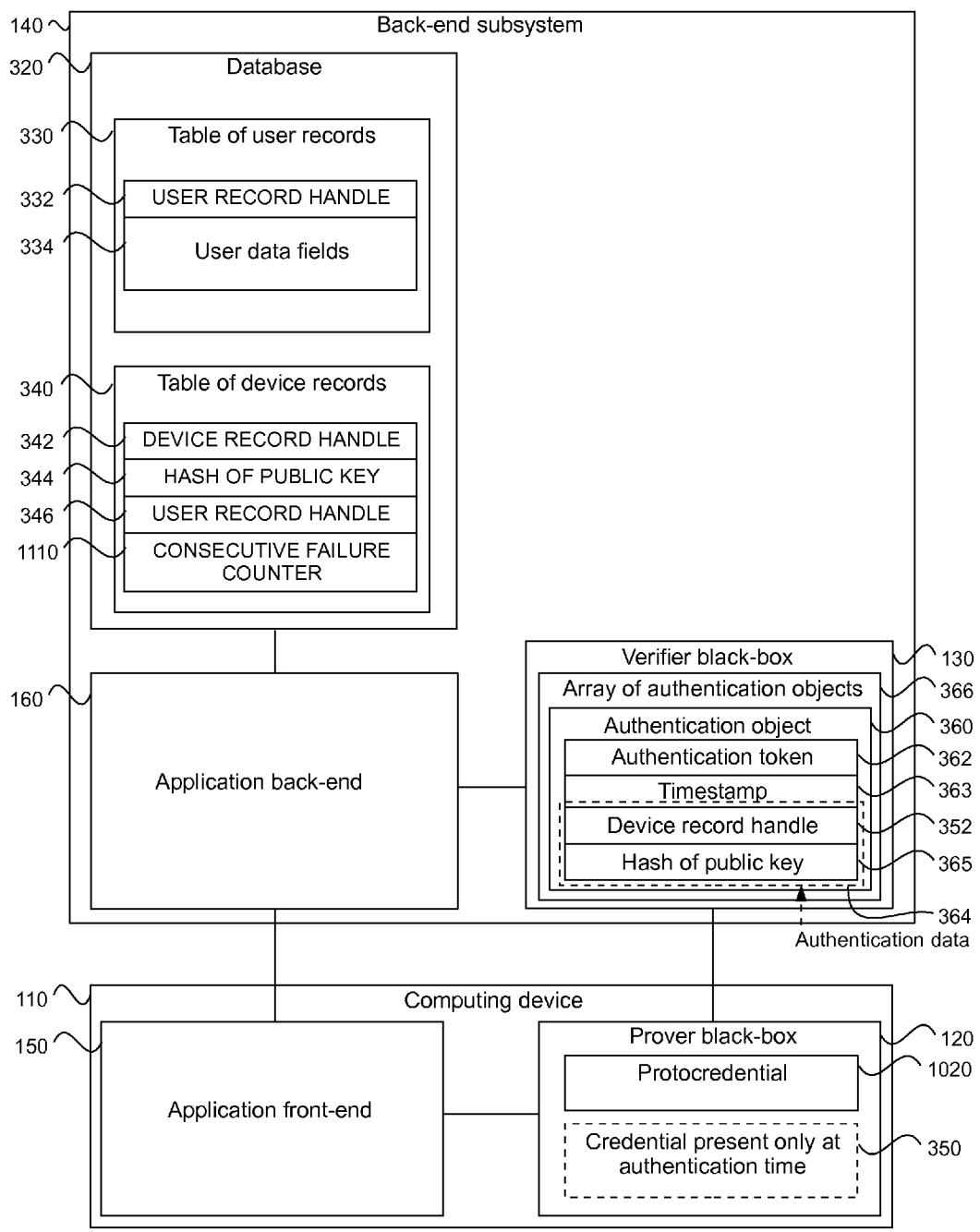
FIG. 11 is a block diagram illustrating a back-end subsystem that limits the number of consecutive authentication failures.

FIG. 11 is a block diagram illustrating the system 100 according to embodiments where the credential 350 is regenerated at authentication time from the protocredential 1020 and the back-end subsystem 140 limits the number of consecutive authentication failures. Each record in the table of device records 340 has a field CONSECUTIVE FAILURE COUNTER 1110 which is initialized to 0, incremented by each authentication failure, and reset to 0 by each successful authentication.

Figure 12:
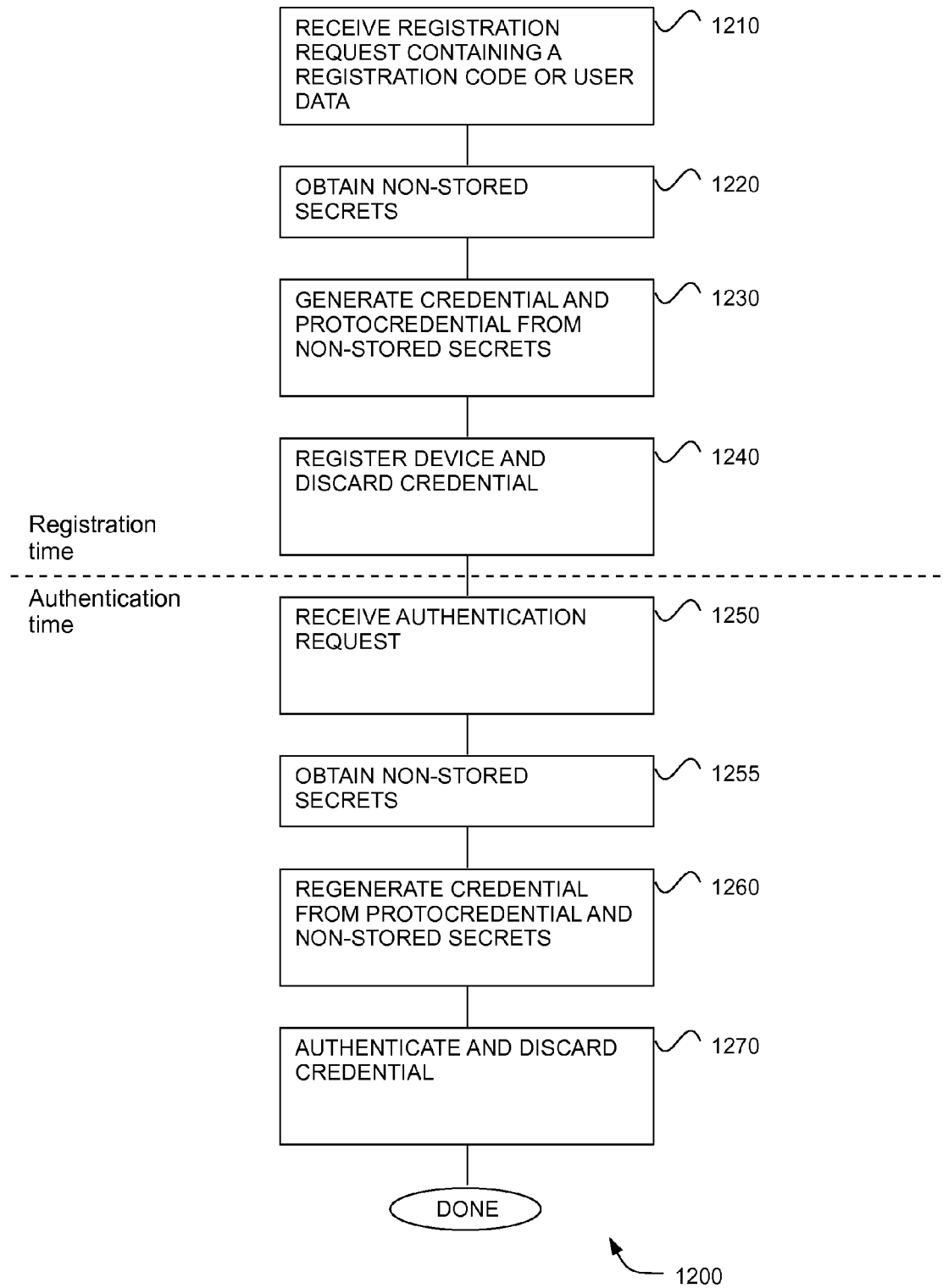
FIG. 12 is a flow diagram illustrating a process for generating a credential and later authenticating with a regenerated credential.

FIG. 12 is a flow diagram illustrating a process 1200 for generating a credential and using it for device registration, then regenerating it and using it for authentication.

At 1210 the application front-end 150 receives a request from the user via the user interface subsystem 180 to register the computing device 110 with the back-end subsystem 140. If the user has previously registered another device, the user supplies a registration code obtained from the other device; otherwise the user supplies user data. The application front-end retains the registration code or user data and sends a message to the prover black-box 120 asking it to generate a credential and a protocredential. Then the process continues at 1220.

At 1220 the prover black-box 120 obtains the non-stored secrets 1010 from the user via the user interface subsystem. Then the process continues at 1230.

At 1230 the prover black-box generates a credential 350 and a protocredential 1020 from the non-stored secrets. The protocredential will later be used in conjunction with the non-stored secrets to regenerate the credential. Then the process continues at 1240.

At 1240 the device 110 uses the credential and the registration code or user data to register with the back-end subsystem, then discards the credential. Details of this step are illustrated hereinafter in FIG. 13. Then the process continues with step 1250, which takes place at authentication time while steps 1210 through 1240 take place at registration time.

At 1250 the application front-end receives a request from the user via the user interface subsystem to authenticate the device to the back-end subsystem, and sends a message to the prover black-box asking it to authenticate cryptographically to the verifier black-box 130. Then the process continues at 1255.

At 1255 the prover black-box 120 obtains the non-stored secrets 1010 from the user via the user interface subsystem. (In embodiments where the non-stored secrets include a biometric sample, the sample obtained at 1255 is not identical to the sample obtained at 1220, but will yield the same credential.) Then the process continues at 1260.

At 1260 the prover black-box regenerates the credential from the protocredential and the non-stored secrets. Then the process continues at 1270.

At 1270 the computing device uses the credential to authenticate to the back-end subsystem. Details of this step are illustrated hereinafter in FIG. 14. The credential is discarded after being used. Then the process terminates.

Figure 13:
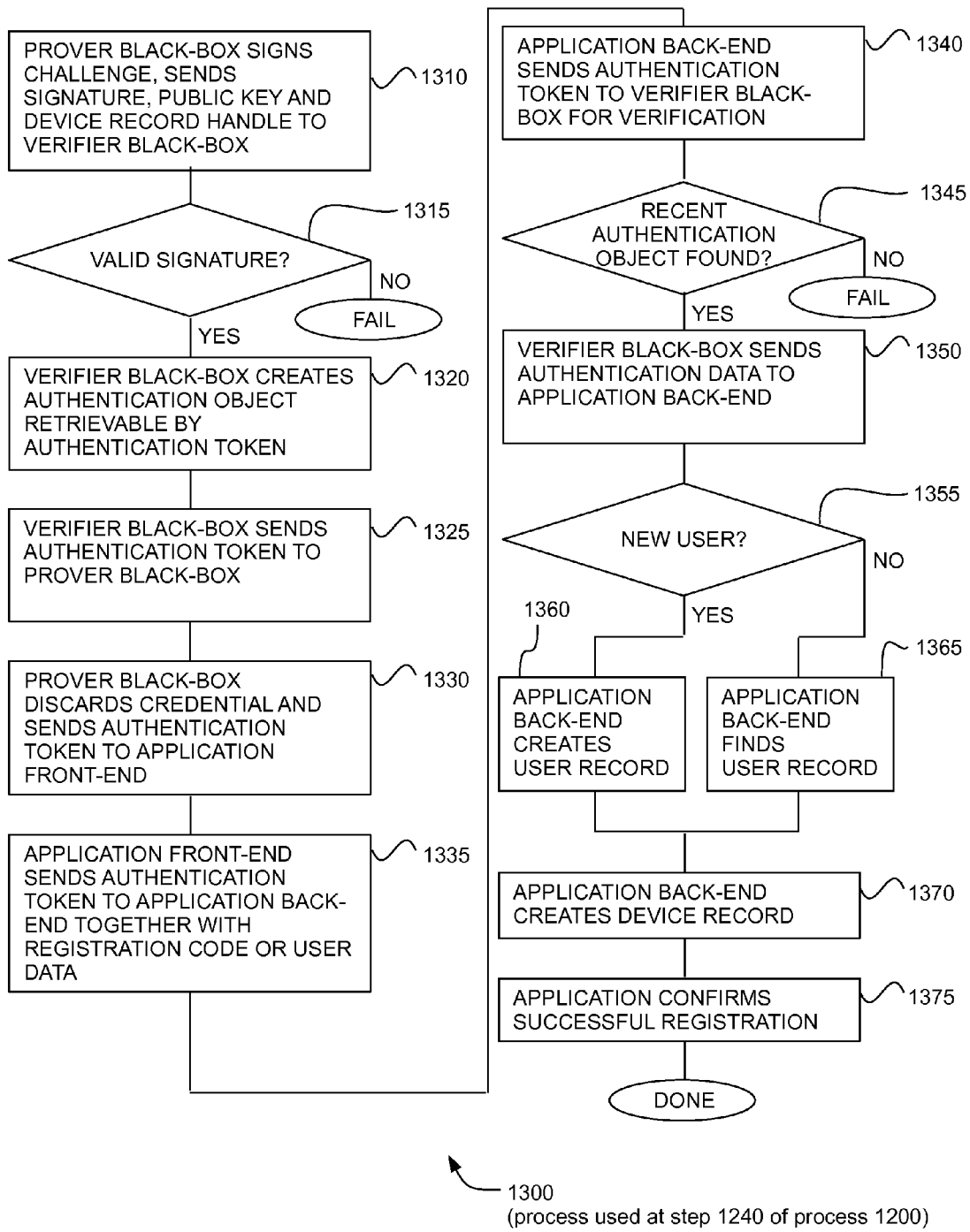
FIG. 13 is a flow diagram illustrating a process for registering a device that contains a credential and discarding the credential.

FIG. 13 is a flow diagram illustrating a process 1300 for registering the device 110 with the back-end subsystem 140, which takes place at step 1240 of process 1200.

Steps 1310, 1315, 1320, and 1325 are identical, respectively, to steps 410, 415, 420, and 425 of process 400.

At 1330 the prover black-box discards the credential and sends a message to the application front-end containing the authentication token. Then the process continues at 1335.

At 1335, the application front-end 150 sends the authentication token obtained from at step 1330 to the application back-end 160 over a TLS connection, together with the registration code or user data received at step 1210 of process 1200. Then process 1300 continues at 1340.

Steps 1340, 1345 and 1350 are identical, respectively, to steps 440, 445 and 450 of process 400.

At 1355, the application back-end determines whether the user is a new user or an existing user for whom a corresponding user record exists in the table of user records 330, based on whether user data or a registration code was received from the application front-end at step 1335. If user data was received, the user is a new user, and process 1300 continues at 1360. If a registration code was received, the user is an existing user and process 1300 continues at 1365.

At 1360 the application back-end creates a user record containing the user data in the user data fields 334 and containing a new user record handle distinct from those of other user records in the USER RECORD HANDLE field 332. In one embodiment the new user record handle is obtained by incrementing a counter of user record handles; in an alternative embodiment it is generated as high-entropy random string, which is distinct from existing user record handles with high probability. Then process 1300 continues at 1370.

At 1365, the application front-end finds a user record identified by the registration code. In one embodiment, the registration code identifies the user record indirectly, the registration code being a handle of a short-lived registration record that in turn contains a user record handle that identifies the user record. Then process 1300 continues at 1370.

At 1370 the application back-end creates a device record containing:

the device record handle 352 that is part of the authentication data received from the verifier black-box 130 at step 1350, in the DEVICE RECORD HANDLE field 342;

the public key hash 365 that is part of the authentication data received from the verifier black-box at step 1350, in the HASH OF PUBLIC KEY field 344; and the value of the USER RECORD HANDLE field 332 of the user record created at step 1360 or found at step 1365, in the USER RECORD HANDLE field 346 of the device record.

Then process 1300 continues at 1375.

At 1375 the application back-end sends a confirmation that the device has been registered successfully to the application front-end, over the same TLS connection used at step 1335, and the application front-end communicates the confirmation to the user over the user interface subsystem. Then process 1300 terminates.

Figure 14:
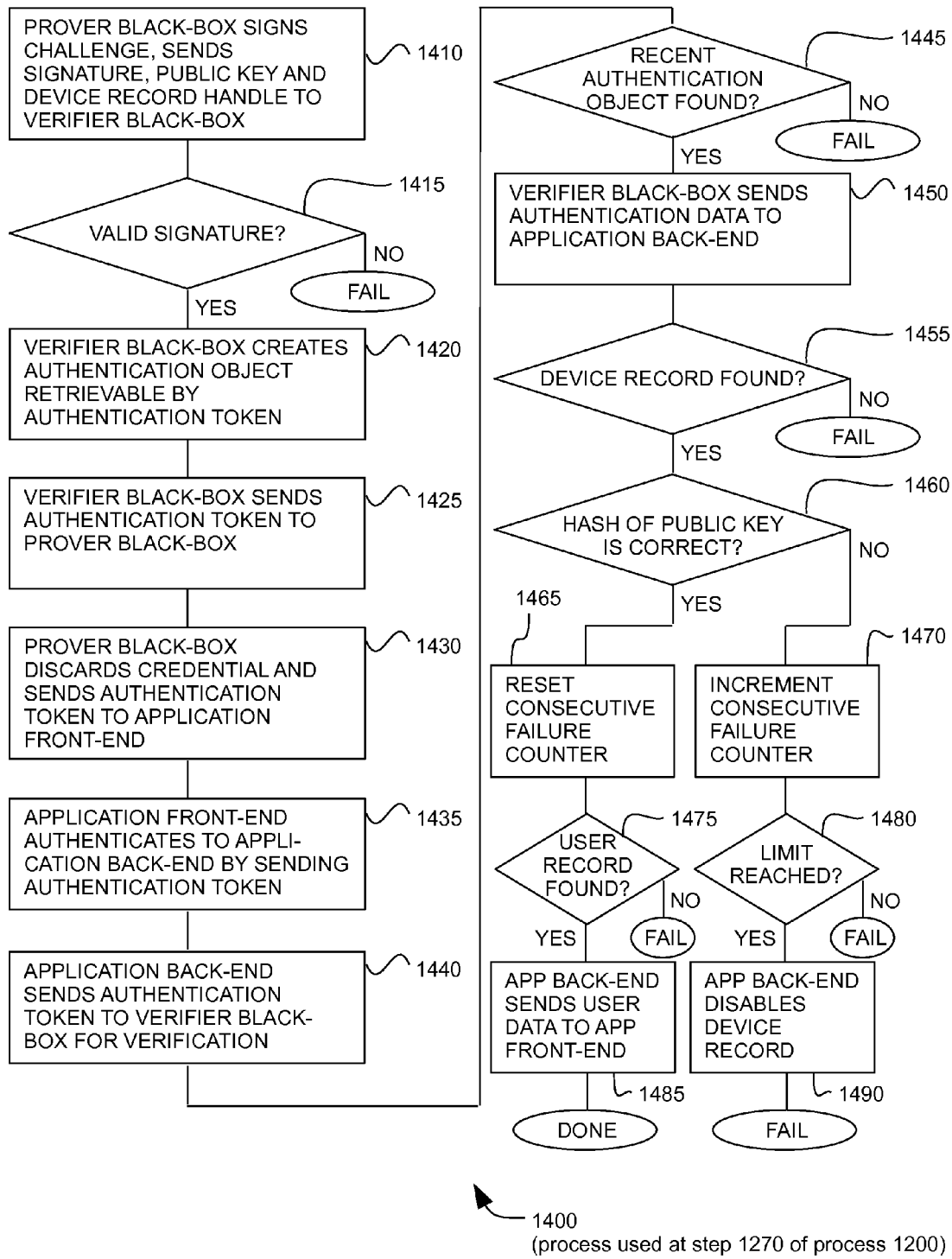
FIG. 14 is a flow diagram illustrating a process for authenticating with a credential and discarding the credential.

FIG. 14 is a flow diagram illustrating a process 1400 for authenticating the device 110 to the back-end subsystem 140, according to embodiments where the back-end subsystem limits the number of consecutive authentication failures as illustrated in FIG. 11. Process 1400 takes place at step 1270 of process 1200.

Steps 1410, 1415, 1420 and 1425 are identical, respectively, to steps 410, 415, 420 and 425 of process 400.

At 1430 the prover black-box discards the credential used at step 1410 and sends a message to the application front-end containing the authentication token. Then the process continues at 1435.

Steps 1435, 1440, 1445 and 1450 are identical, respectively, to steps 435, 440, 445 and 450 of process 400.

At 1455 the application back-end looks in the database 320 for a device record whose DEVICE RECORD HANDLE field 342 contains the device record handle 352 that is part of the authentication data received from the verifier black-box 130 at step 1450. If no such record is found, the process fails. Otherwise process 1400 continues at 1460.

At 1460 the application back-end checks if the HASH OF PUBLIC KEY field 344 of the device record found at step 1455 contains the public key hash 365 that is part of the authentication data received from the verifier black-box at step 1450. If so, process 1400 continues at 1465. Otherwise it continues at 1470.

At 1465, the application back-end resets to 0 the CONSECUTIVE FAILURE COUNTER field 1110 of the device record. Then process 1400 continues at 1475.

At 1470, the application back-end increments by 1 the CONSECUTIVE FAILURE COUNTER field 1110 of the device record. Then process 1400 continues at 1480.

At 1475 the application back-end looks in the database 320 for a user record whose USER RECORD HANDLE field 332 has the same value as the USER RECORD HANDLE field 346 of the device record found at step 1455. If no such record is found, process 1400 fails; otherwise it continues at 1485.

At 1480 the application back-end checks if the value of the CONSECUTIVE FAILURE COUNTER field 1110 of the device record has reached a configured limit of consecutive failures; in one embodiment the configured limit is 5. If the configured limit has been reached, process 1400 continues at 1490; otherwise it fails.

At 1485 the application back-end sends user data contained in the user data fields 334 of the user record found at step 1475 to the application front-end over the same TLS connection used at step 1435. Then the process terminates successfully: the device has been successfully authenticated to the application back-end as being the device corresponding to the device record found at step 1455, owned by the user corresponding to the user record found at step 1475.

At 1490 the application back-end disables the device record found at step 1455. In one embodiment the application back-end disables the record by setting a value in a field of the record indicating that the record is disabled. In an alternative embodiment the application back-end deletes the record from the database. Once the record is disabled the device must be registered again with the back-end subsystem before it can be used by the application. After the application back-end disables the record, process 1400 fails.

Some embodiments differ from embodiments discussed so far in that the credential used at authentication time does not comprise a complete key pair. A complete key pair is generated at registration time and used to register the device, but the credential regenerated at authentication time comprises the private but not the public key portion of the key pair. In such embodiments the prover black-box authenticates to the verifier black-box by proving knowledge of the private key and sending the device record handle but not the public key. The verifier black-box has access to the database, and uses the device record handle to locate the device record, which contains the public key rather than a hash of the public key. The verifier black-box uses the public key found in the record to verify the proof of knowledge of the private key. The verifier black-box retrieves user data from the user record referenced by the device record and stores it as authentication data in the authentication object, instead of the hash of the public key. The user data is delivered to the application back-end upon presentation of the authentication token.

Figure 15:
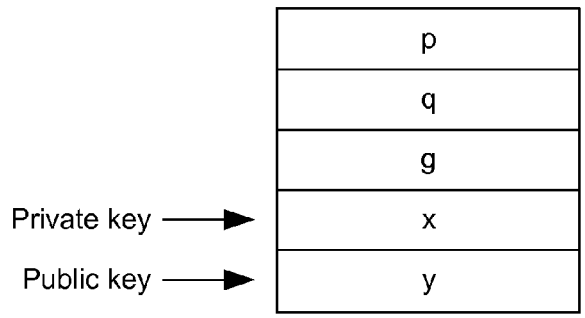
FIG. 15 is a block diagram illustrating a key pair pertaining to the DSA cryptosystem.

FIG. 15 illustrates a key pair 1500 pertaining to the DSA cryptosystem, using the notations of Section 4.1 of the Digital Signature Standard (DSS), publication FIPS PUB 186-4 of the National Institute of Standards and Technology (NIST). The key pair comprises parameters p, q, g, x and y. As in the DSS, the variables L and N will be used hereinafter to refer to the bitlengths of p and q respectively. Parameter x is the private key and parameter y is the public key. A signature is computed using x, p, q and g (plus a per-message secret parameter k) as specified in Section 4.6 of the DSS. A signature is verified using the parameters y, p, q and g as specified in Section 4.7 of the DSS. The additional parameters p, q and g are called domain parameters by NIST, because they can be shared by multiple key pairs within a domain. Even though the DSS refers to y as the public key, in preferred embodiments the public key includes the parameters p, q and g in addition to y. In such embodiments it would be reasonable to refer to the private key as comprising x, p, q and g, since those four parameters are all required to compute a signature; the public and private keys would then be overlapping portions of the key pair.

Figure 16:
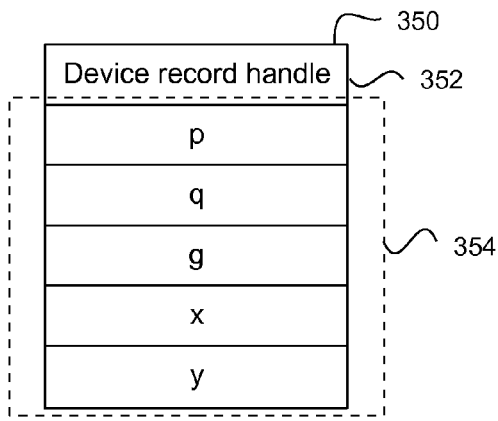
FIG. 16 is a block diagram illustrating a credential containing a DSA key pair.

FIG. 16 illustrates a credential 350 according to some embodiments that use DSA. The credential comprises a device record handle 352, and a key pair 354 pertaining to the DSA cryptosystem containing the parameters p, q, g, x and y encoded as strings of respective bitlengths L, N, L, N and L.

Figure 17:
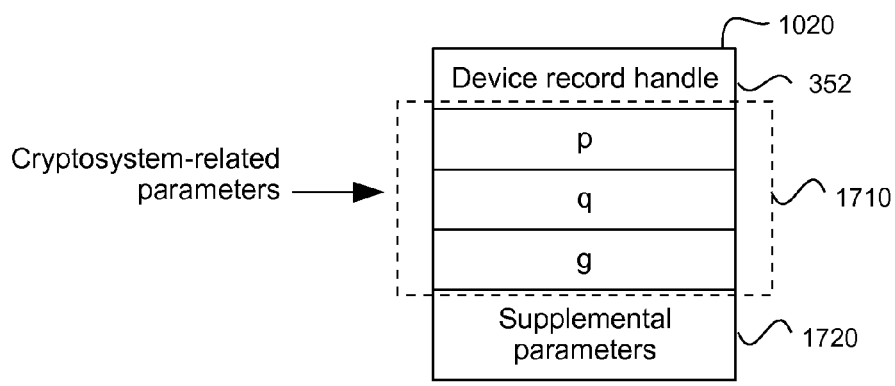
FIG. 17 is a block diagram illustrating a protocredential used to regenerate a credential containing a DSA key pair.

FIG. 17 illustrates a protocredential 1020 that is used in conjunction with the non-stored secrets 1010 to regenerate the credential 350 of FIG. 16, according to some embodiments. The protocredential comprises the device record handle 352, a set of cryptosystem-related parameters 1710 consisting of p, q and g encoded as strings of bitlengths L, N and L, and a set of supplemental parameters 1720, related to the non-stored secrets. Whereas the cryptosystem-related parameters are specific to the particular cryptosystem being used, such as DSA, ECDSA or RSA, the supplemental parameters are specific to the kind of non-stored secrets being used, such as a passcode, or a biometric sample, or both a passcode and a biometric sample.

Figure 18:
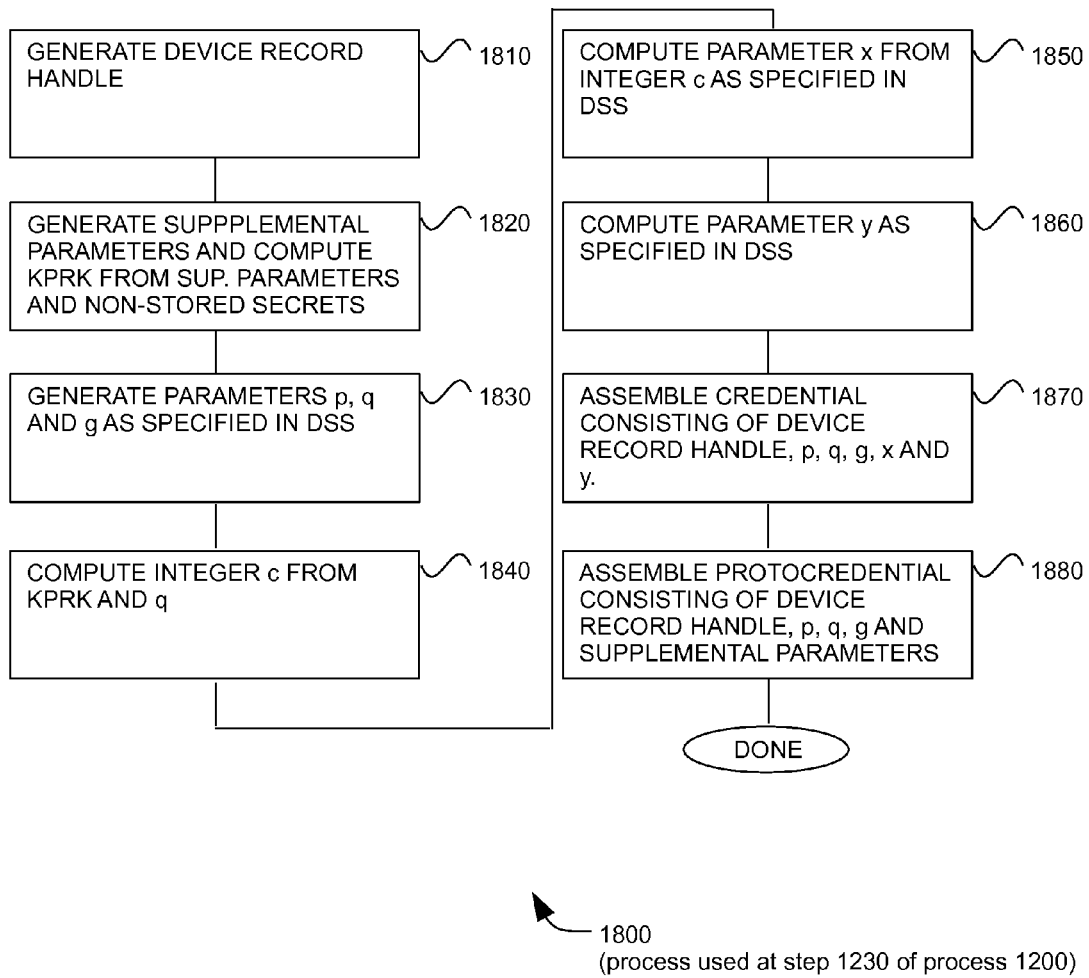
FIG. 18 is a flow diagram illustrating a process for generating a credential that contains a DSA key pair and a protocredential.

FIG. 18 is a flow diagram illustrating a process 1800 for generating the credential 350 of FIG. 16 and the protocredential 1020 of FIG. 17 in preferred embodiments. The process 1800 takes place at step 1230 of process 1200, after the non-stored secrets have been obtained at step 1220.

At 1810 the prover black-box 120 generates the device record handle 352 as a random high-entropy string, so that it is different from any other device record handles with high probability. (In alternative embodiments a unique device record handle is allocated by the database management system that manages the database 320 when the device record is created, and added to the protocredential 1020 at that time.) Then the process continues at 1820.

At 1820 the prover black-box generates the supplemental parameters and computes a Key-Pair Regeneration Key (KPRK) from the supplemental parameters and the non-stored secrets. The KPRK is of bitlength N+64, N being the bitlength of q. Then the process continues at 1830.

At 1830 the prover black-box generates the parameters p, q and g as described in Section 4.3.1 and appendices A.1 and A.2 of the DSS. Then the process continues at 1840.

At 1840 the prover black-box computes an integer "c" as specified at step 5 of the process described in Appendix B.1.1 of the DSS, using the KPRK instead of the string called "returned_bits" in the DSS. Then the process continues at 1850.

At 1850 the prover black-box computes the parameter x as specified in step 6 of the process described in Appendix B.1.1 of the DSS, using the integer "c" computed at step 1840. Then the process continues at 1860.

At 1860 the prover black-box computes the parameter y as specified in step 7 of the process described in Appendix B.1.1 of the DSS. Then the process continues at 1870.

At 1870 the prover black-box assembles the credential 350, consisting of the device record handle, and the parameters p, q, g, x and y, encoded as strings of bitlength L, N, L, N and L respectively. Then the process continues at 1880.

At 1880 the prover black-box assembles the protocredential 1020, consisting of the device record handle, the cryptosystem-related parameters p, q and g encoded as strings of bitlength L, N and L respectively, and the supplemental parameters. Then the process terminates.

Figure 19:
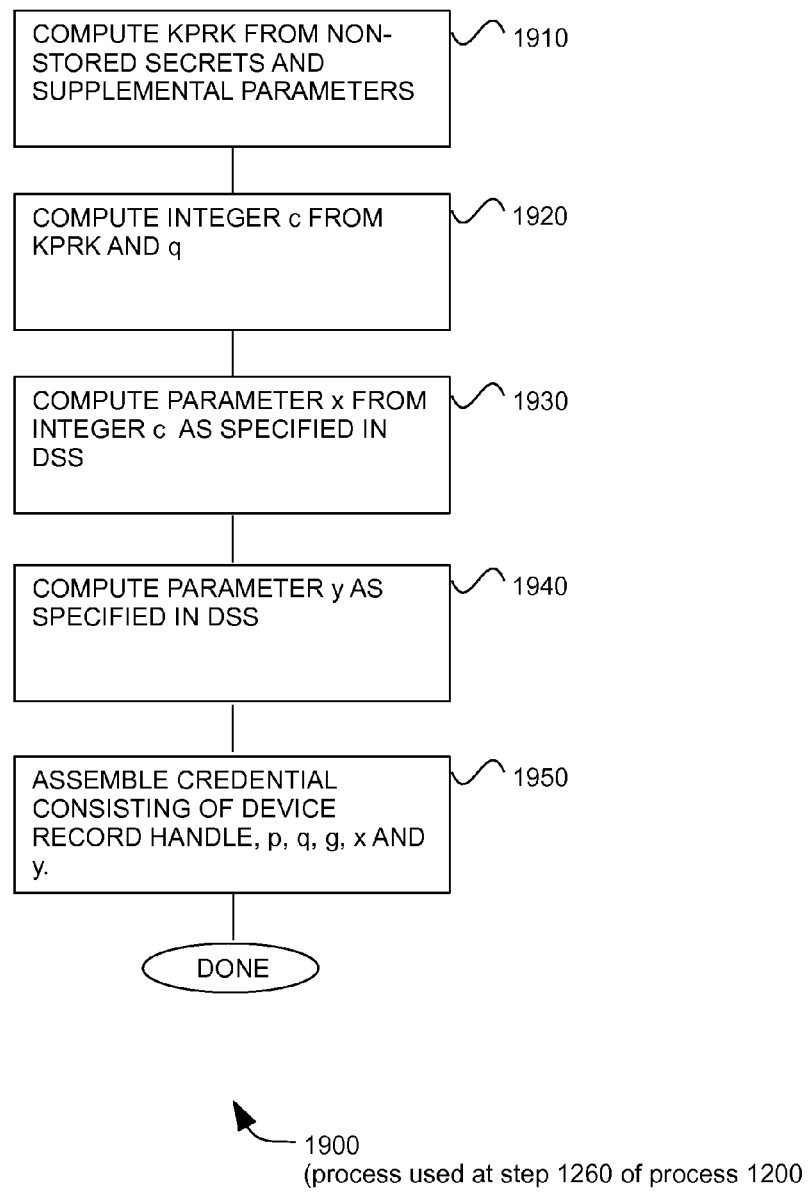
FIG. 19 is a flow diagram illustrating a process for regenerating a credential that contains a DSA key pair.

FIG. 19 is a flow diagram illustrating a process 1900 for regenerating the credential 350 of FIG. 16 from the protocredential 1020 of FIG. 17 and the set of non-stored secrets 1010. The process 1900 takes place at step 1260 of process 1200.

At 1910 the prover black-box computes a KPRK of bitlength N+64, N being the bitlength of the parameter q in the protocredential, from the supplemental parameters in the protocredential and the non-stored secrets. Then the process continues at 1920.

At 1920 the prover black-box computes an integer "c" as specified at step 5 of the process described in Appendix B.1.1 of the DSS, using the KPRK instead of the string called "returned_bits" in the DSS. Then the process continues at 1930.

At 1930 the prover black-box computes the parameter x from the integer c as specified in step 6 of the process described in Appendix B.1.1 of the DSS. Then the process continues at 1940.

At 1940 the prover black-box computes the parameter y as specified in step 7 of the process described in Appendix B.1.1 of the DSS. Then the process continues at 1950.

At 1950 the prover black-box assembles the credential 350, consisting of the device record handle found in the protocredential, the parameters p, q, g found in the protocredential, encoded as strings of bitlength L, N and L respectively, and the newly computed parameters x and y, encoded as strings of bitlength N and L respectively. Then the process terminates.

Figure 20:
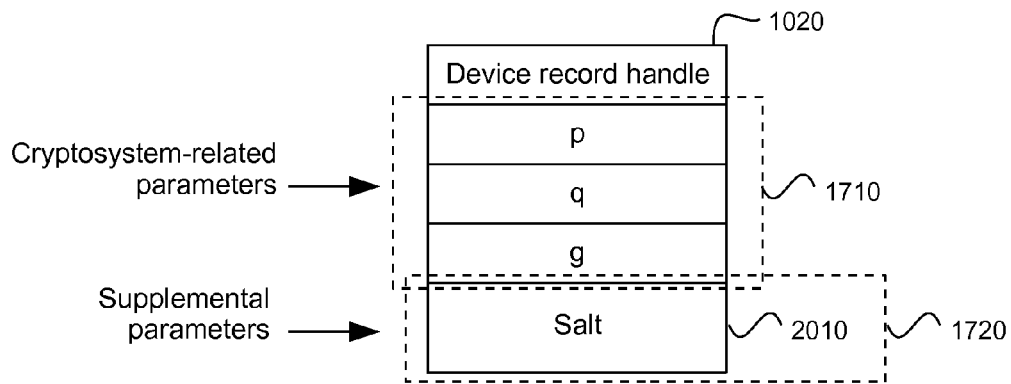
FIG. 20 is a block diagram illustrating a protocredential used to regenerate a credential containing a DSA key pair from a passcode.

FIG. 20 illustrates a protocredential 1020 that is used in conjunction with the non-stored secrets 1010 to regenerate the credential 350 of FIG. 16, according to some embodiments where the set of non-stored secrets consists of a single passcode. The set of supplemental parameters 1720 consists of a random high-entropy salt 2010. In a preferred embodiment the salt is kept secret. The device record handle 1020 and the cryptosystem-related parameters 1710 are as in FIG. 17.

Figure 21:
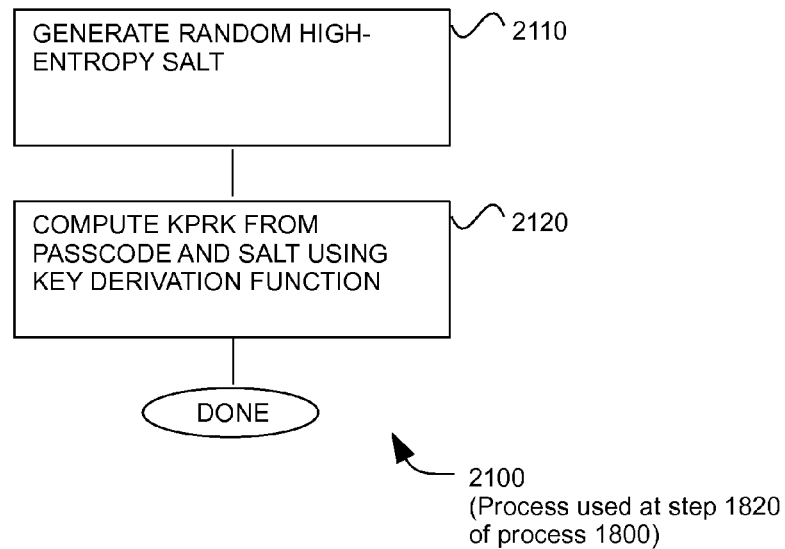
FIG. 21 is a flow diagram illustrating a process of generating a salt and computing a key-pair regeneration key from the salt and a passcode.

FIG. 21 is a flow diagram illustrating a process 2100 for performing step 1820 of process 1800, according to some embodiments where the set of non-stored secrets 1010 consists of a passcode, and the protocredential 1020 is as illustrated in FIG. 20. Process 1820 is performed at step 1230 of process 1200, after the passcode has been obtained at step 1220.

At 2110 the prover black-box generates the salt 2010 as a random high-entropy string using an entropy accumulator such as the /dev/urandom facility of Linux and other Unix systems. Then the process continues at 2120.

At 2120 the prover black-box computes the KPRK by applying the HMAC-based Extract-and-Expand Key Derivation Function (HKDF), described in Request For Comments (RFC) 5869 of the Internet Engineering Task Force (IETF), to the passcode, used as Input Keying Material (IKM), and the salt, the length of output being N+64 bits, where N is the bitlength of the parameter q.

(Other key derivation functions, such as PBKDF2, described in Section 5.2 of RFC 2892 of the IETF, are used in alternative embodiments.) Then the process terminates.

Figure 22:
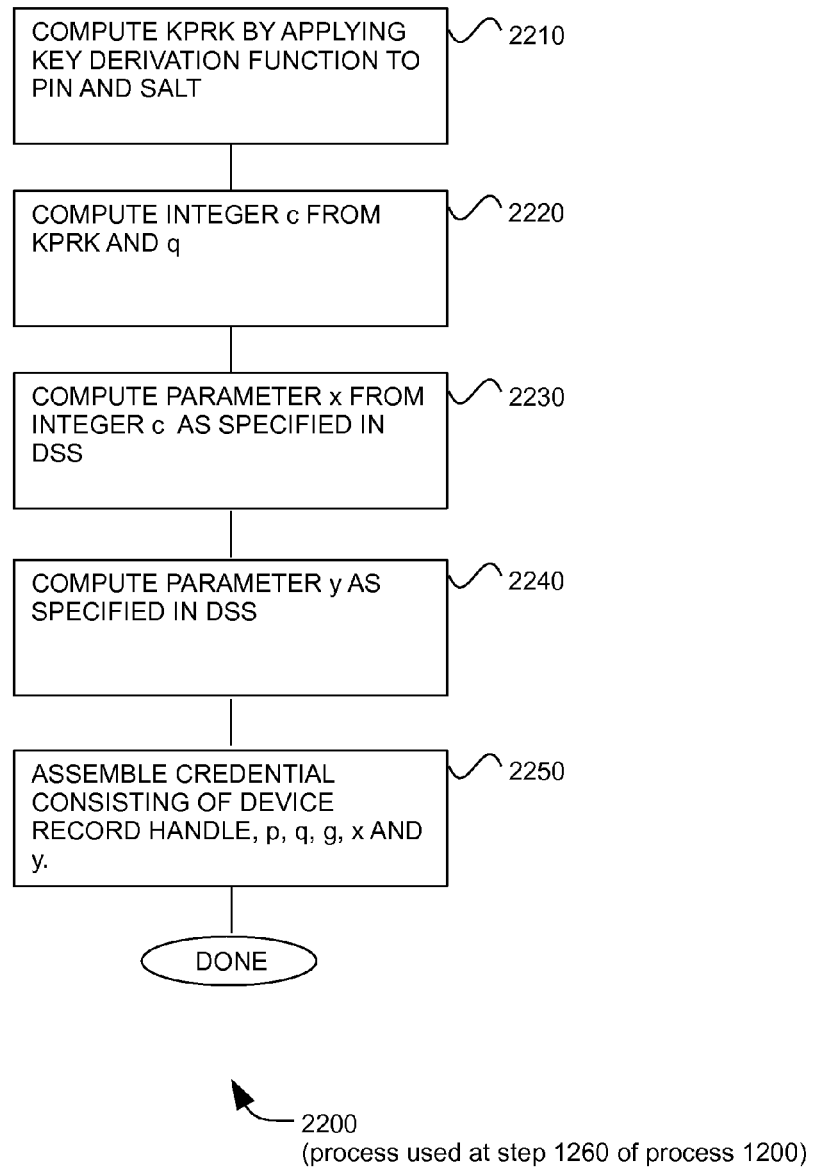
FIG. 22 is a flow diagram illustrating a credential regeneration process for regenerating a credential that contains a DSA key pair from a 4-digit PIN and a protocredential.

FIG. 22 is a flow diagram illustrating a credential regeneration process 2200 for regenerating the credential 350 of FIG. 16 from the protocredential 1020 of FIG. 20 and a set of non-stored secrets 1010 consisting of a 4-digit PIN, the PIN being a special case of a passcode. Process 2200 is a more specific version of process 1900, and takes place at step 1260 of process 1200.

At 2210 the prover black-box computes a KPRK by applying the HKDF key derivation function to the PIN used as Input Keying Material (IKM) and the salt 2010, the length of output being N+64 bits, where N is the bitlength of the parameter q. (Other key derivation functions, such as PBKDF2 are used in alternative embodiments.) Then the process continues at 2220.

Steps 2220, 2230, 2240 and 2250 are identical to steps 1920, 1930, 1940 and 1950 or process 1900, respectively.

Figure 23:
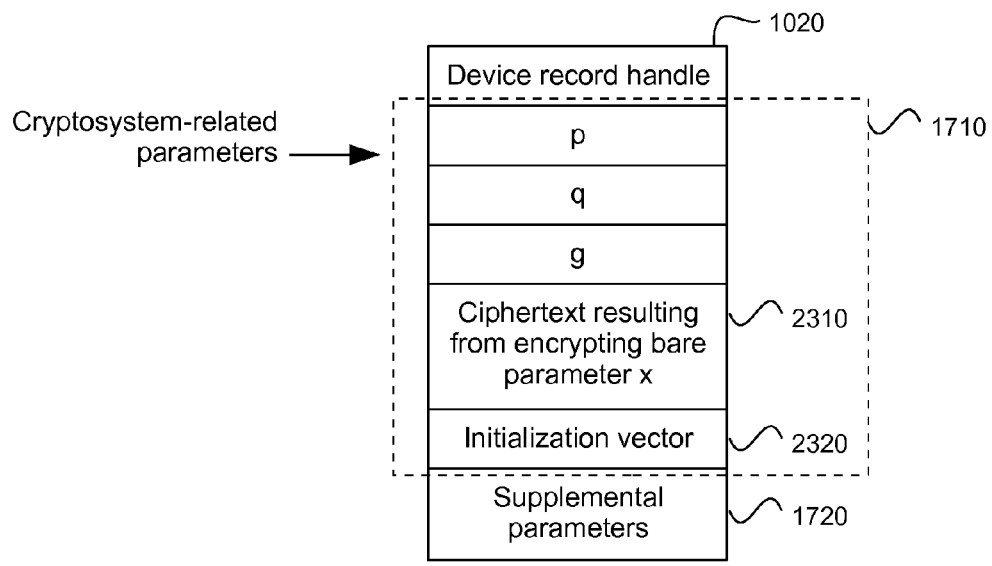
FIG. 23 is a block diagram illustrating a protocredential containing an encryption of a bare parameter.

FIG. 23 illustrates a protocredential 1020 used to regenerate the credential 350 of FIG. 16, according to some embodiments alternative to those illustrated in FIG. 17. The set of cryptosystem-related parameters comprises two additional parameters besides those of FIG. 17: a ciphertext 2310 and an initialization vector 2320. The ciphertext 2310 is the result of encrypting the bare parameter x encoded as an N-bit string, without padding, using the Advanced Encryption Standard (AES) in Cipher Feedback (CFB) mode with initialization vector 2320. The term "bare parameter" means a parameter that is not wrapped in a data structure. (In various prior art techniques, parameters are wrapped in ASN.1 data structures before being encrypted.) AES is specified in FIPS PUB-197 of NIST. CFB is specified in NIST Special Publication 800-38A. (In alternative embodiments other modes of operation that do not require padding, such as OFB, are used instead of CFB, and other encryption algorithms are used instead of AES.) The variable M will be used hereinafter to refer to the bitlength of the AES encryption key. Values of M are 128, 192 and 256 in various embodiments.

Figure 24:
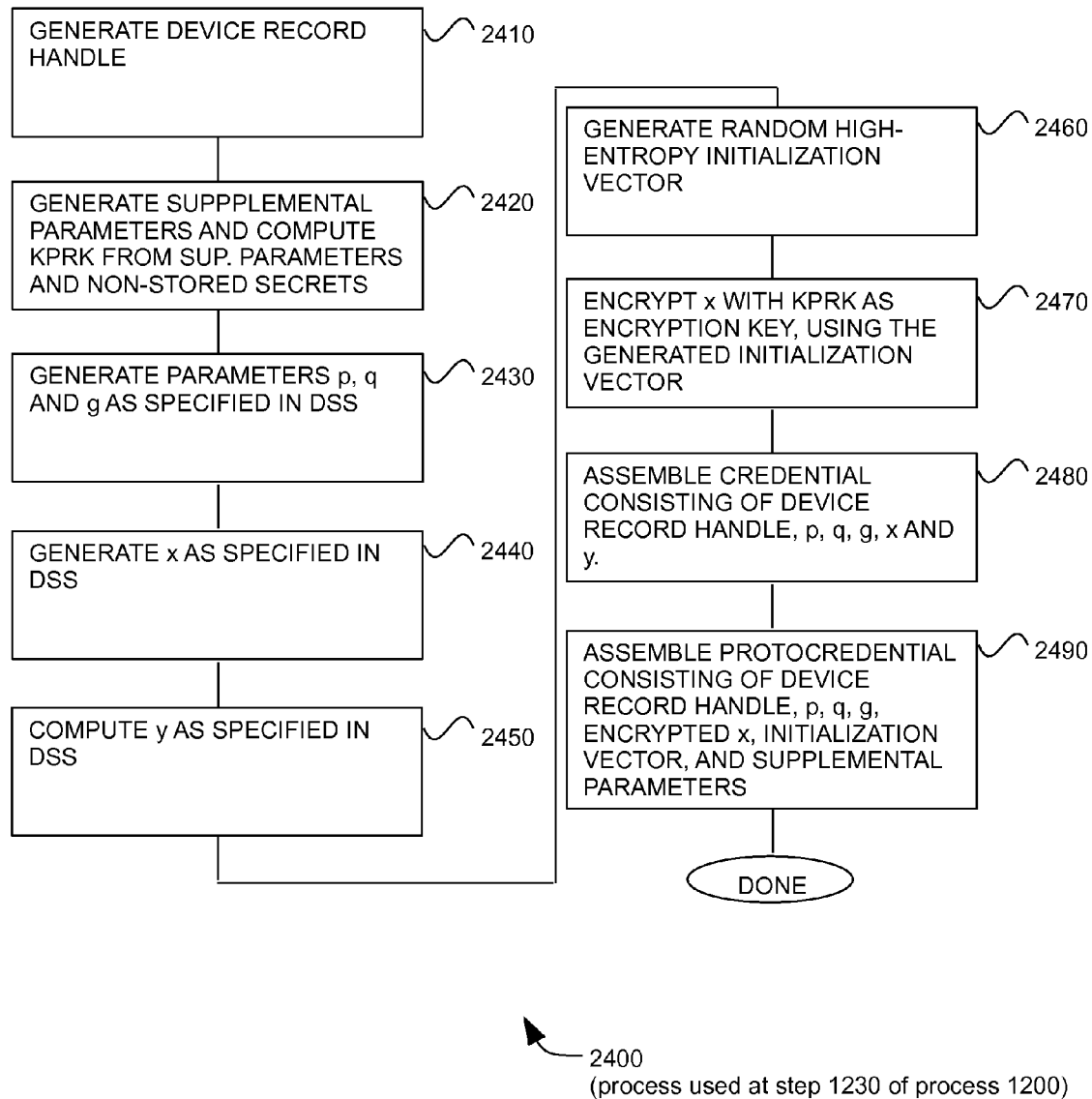
FIG. 24 is a flow diagram illustrating a process of generating a credential and a protocredential that contains an encryption of a bare parameter.

FIG. 24 is a flow diagram illustrating a process 2400 for generating the credential 350 of FIG. 16 and the protocredential 1020 of FIG. 23. The process 2400 takes place at step 1230 of process 1200, after the non-stored secrets have been obtained at step 1220.

At 2410 the prover black-box 120 generates the device record handle 352 as in step 1810 of process 1800. Then the process continues at 2420.

At 2420 the prover black-box generates the supplemental parameters and computes an M-bit Key-Pair Regeneration Key (KPRK) from the supplemental parameters and the non-stored secrets. In some embodiments the set of non-stored secrets 1010 consists of a passcode, the supplemental parameters consist of a random high-entropy salt generated by an entropy accumulator such as /dev/urandom, and the KPRK is computed by generating M bits of output from HKDF applied to the passcode, playing the role of Input Keying Material (IKM), and the salt. (Other key derivation functions such as PBKDF2 are used in alternative embodiments.) Then the process continues at 2430.

At 2430 the prover black-box computes the parameters p, q and g as described in Section 4.3.1 and appendices A.1 and A.2 of the DSS. Then the process continues at 2440.

At 2440 the prover black-box generates the parameter x, computing it from an integer "c" that is itself computed from randomly generated bits as described in steps 3-6 of the process specified in Appendix B.1.1 of the DSS. Then the process continues at 2450.

At 2450 the prover black-box computes the parameter y as specified in step 7 of the process described in Appendix B.1.1 of the DSS. Then the process continues at 2460.

At 2460 the prover black-box generates a random 128-bit string to be used as the initialization vector 2320. Then the process continues at 2470.

At 2470 the prover black-box encrypts the bare parameter x, encoded as an N-bit string, without padding, using AES in CFB mode, with the KPRK as encryption key, and the string generated at step 2460 as initialization vector. Then the process continues at 2480.

At 2480 the prover black-box assembles the credential 350, consisting of:
  the device record handle; and
  the parameters p, q, g, x and y encoded as strings of bitlength L, N, L, N and L respectively.
Then the process continues at 2490.

At 2490 the prover black-box assembles the protocredential 1020, consisting of:
  the device record handle;
  the parameters p, q and g, encoded as strings of bitlength L, N and L respectively;
  the encrypted bare parameter x computed at step 2470;
  the initialization vector generated at step 2460; and
  the supplemental parameters.
Then the process terminates.

Figure 25:
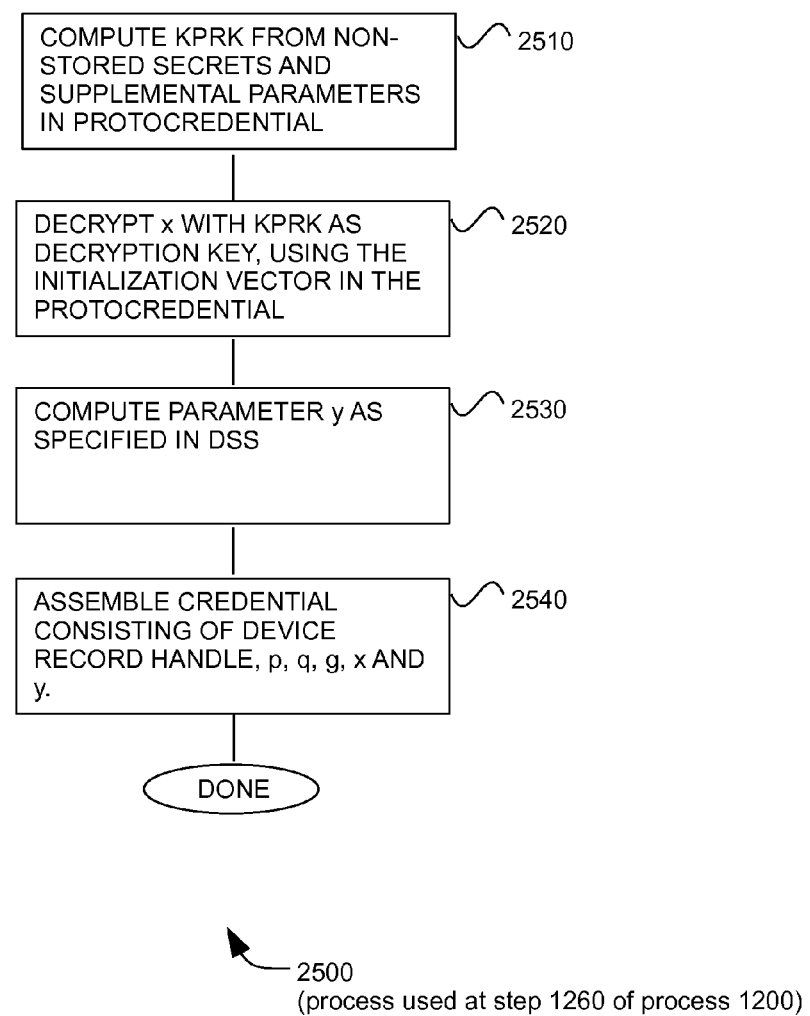
FIG. 25 is a flow diagram illustrating a process of regenerating a credential from a protocredential that contains an encryption of a bare parameter.

FIG. 25 is a flow diagram illustrating a process 2500 for regenerating the credential 350 of FIG. 16 from the protocredential 1020 of FIG. 23 and the set of non-stored secrets 1010. The process 2500 takes place at step 1260 of process 1200.

At 2510 the prover black-box computes an M-bit KPRK from the supplemental parameters in the protocredential and the non-stored secrets. Then the process continues at 2520.

At 2520 the prover black-box decrypts the encrypted parameter 2310 using AES in CFB mode, with the KPRK as decryption key, using the initialization vector 2320 in the protocredential, obtaining x. Then the process continues at 2530.

At 2530 the prover black-box computes the parameter y as specified in step 7 of the process described in Appendix B.1.1 of the DSS. Then the process continues at 2540.

At 2540 the prover black-box assembles the credential 350, consisting of the device record handle, the parameters p, q, g found in the protocredential, encoded as strings of bitlength L, N and L respectively, and the newly computed parameters x and y, encoded as strings of bitlength N and L respectively. Then the process terminates.

Figure 26:
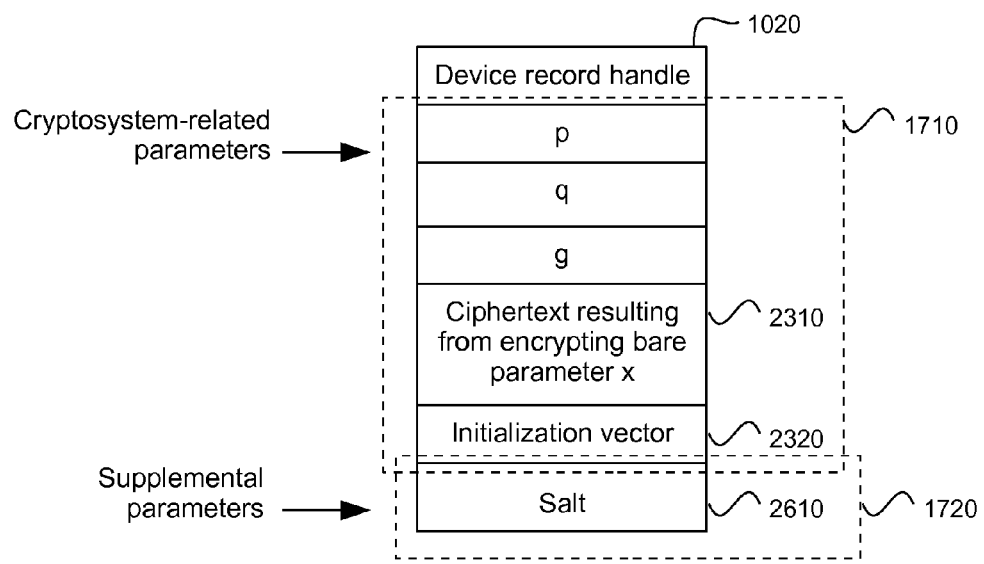
FIG. 26 is a block diagram illustrating a protocredential containing an encryption of a bare parameter, for use in conjunction with a passcode.

FIG. 26 illustrates a more specific version of the protocredential 1020 of FIG. 23, used in embodiments where the set of non-stored secrets consists of a passcode, such as a 4-digit PIN. The set of supplemental parameters 1720 consists of a random high-entropy salt 2610. The device record handle 1020 and the cryptosystem-related parameters 1710 are as in FIG. 23.

Figure 27:
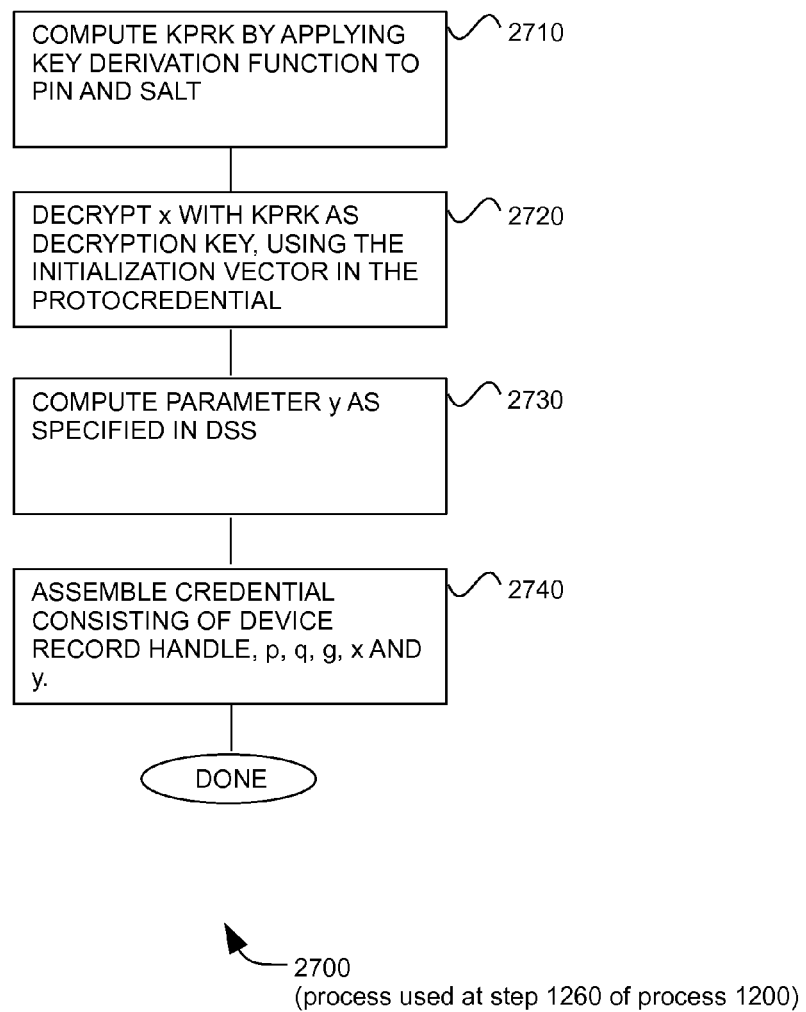
FIG. 27 is a flow diagram illustrating a credential regeneration process for regenerating a credential from a 4-digit PIN and a protocredential that contains an encryption of a bare parameter.

FIG. 27 is a flow diagram illustrating a credential regeneration process 2700 for regenerating the credential 350 of FIG. 16 from the protocredential 1020 of FIG. 26 and a set of non-stored secrets 1010 consisting of a 4-digit PIN. Process 2700 is a more specific version of process 2500, and takes place at step 1260 of process 1200.

At 2710 the prover black-box computes a KPRK by applying the HKDF key derivation function to the PIN used as Input Keying Material (IKM) and the salt 2610, the length of output being M bits. (Other key derivation functions, such as PBKDF2 are used in alternative embodiments.) Then the process continues at 2720.

Steps 2720, 2730 and 2740 are identical to steps 2520, 2530 and 2540 of process 2500.

One of the advantages of the present invention is that it provides better protection against an adversary who captures the computing device 110 and is able to read all data stored in the device.

In cryptographic authentication with a key pair according to prior art, the key pair is stored in the device, either in the clear, or wrapped in an ASN.1 data structure ("the wrapper") that is encrypted using a key derived from a passcode. If the key pair is in the clear, the adversary can use it to authenticate. If the key pair is wrapped and encrypted, the adversary can mount an offline dictionary attack against the passcode. To test a passcode, the adversary derives the corresponding key and uses it to decrypt the encrypted wrapper. If the passcode is incorrect, the result of the decryption has a negligible probability of being well formed, for three different reasons: it is unlikely to be a well-formed wrapper; even if it is a well-formed wrapper, at least some of the purported parameters in the wrapper are unlikely to have their expected properties, such as being prime; and even if all the purported parameters have their expected properties, the purported private key and public key portions of the key pair are unlikely to match each other.

By contrast, embodiments of the present invention provide effective countermeasures against offline attacks.

In one embodiment, the credential 350 illustrated in FIG. 16 is regenerated from the protocredential 1020 illustrated in FIG. 20 and a 4-digit PIN using the credential regeneration process 2200 of FIG. 22; then the credential is used for authentication using the process 1400 of FIG. 14. When an adversary applies the credential regeneration process 2200 to a guess of the PIN rather than to the correct PIN, the probability of the process producing well-formed output (well-formed output being a credential 350 as illustrated in FIG. 16) is 100%, even though the probability of the process producing correct output (correct output being the credential 350 that was used at registration time) is close to 1 in 10,000 when PIN guesses are uniformly distributed. (There are 10,000 4-digit PINs, and the probability that two PINs produce the same credential is negligible.) If the public key y is treated as a shared secret between the computing device 110 and the back-end subsystem 140, the adversary cannot mount an offline attack. The adversary can only test a guessed PIN by authenticating online to the back-end subsystem rather than offline; and the back-end subsystem limits the number of guesses at step 1490 of process 1400.

In another embodiment, the credential 350 illustrated in FIG. 16 is regenerated from the protocredential 1020 illustrated in FIG. 26 and a 4-digit PIN using the process 2700 of FIG. 27; then the credential is used for authentication using the process 1400 of FIG. 14. The protocredential includes a ciphertext 2310. But the ciphertext 2310 is the encryption of the single bare parameter. No ASN.1 wrapping is applied to the parameter before encrypting, and no public key is included in the protocredential. When an adversary applies process 2700 to a guess of the PIN rather than to the correct PIN, the output of the process is not necessarily well-formed, because the result of decrypting the ciphertext with an incorrect key at step 2720 may not be in the interval [1, q−1] that the parameter x belongs to. However, the result of the decryption is close to uniformly distributed over the binary strings of same bitlength N as q, and q is greater than $2^N$, so the probability of the output being well-formed is at least 50%, even though the probability of the process producing correct output (correct output being the credential 350 that was used at registration time) is 1 in 10,000 when PIN guesses are uniformly distributed. (There are 10,000 4-digit PINs, and the probability that two PINs produce the same credential is negligible.) If the public key y is treated as a shared secret between the computing device 110 and the back-end subsystem 140, the adversary cannot mount an effective offline attack. At least every other PIN guess will result in well-formed output and will have to be tested online rather than offline by authenticating to the back-end subsystem, which sets a limit on the number of guesses at step 1490 of process 1400. In one embodiment where the limit is 5, the adversary will be able to make only about 10 or fewer guesses before the limit is reached and the application back-end disables the device record at step 1490 of process 1400.

Several biometric key generation methods have been described in the literature, for computing a biometric key from a biometric sample and auxiliary data (also called helper data). At enrollment time, the user provides an enrollment biometric sample, which is used to generate the biometric key and the auxiliary data. (In some methods the biometric key is independent of the sample.) At authentication time, the user provides an authentication sample, and the biometric key is computed from the biometric sample and the auxiliary data. The biometric key computed at authentication time is the same as the biometric key generated at enrollment time with moderately high probability even though the authentication sample is not identical to the enrollment sample, as long as the authentication sample is genuine.

One biometric key generation method is described in the Technical Report Number 640 of the Computer Laboratory of the University of Cambridge, entitled "Combining cryptography with biometrics effectively", by Feng Hao, Ross Anderson and John Daugman, dated July 2005. References to other biometric key generation methods can be found in Sections 3.3 and 3.4 of the review article entitled "Biometric Template Security", by Anil K. Jain, Karthik Nandakumar and Abhishek Nagar, in the EURASIP Journal on Advances in Signal Processing, Volume 2008, Article ID 579416.

Any biometric key generation method can be combined with the present invention to enable the use of a biometric sample as a non-stored secret for regeneration of a credential from a protocredential and a set of non-stored secrets. Biometric enrollment takes place when the computing device 110 is registered with the back-end subsystem 140, so enrollment time is registration time.

Figure 28:
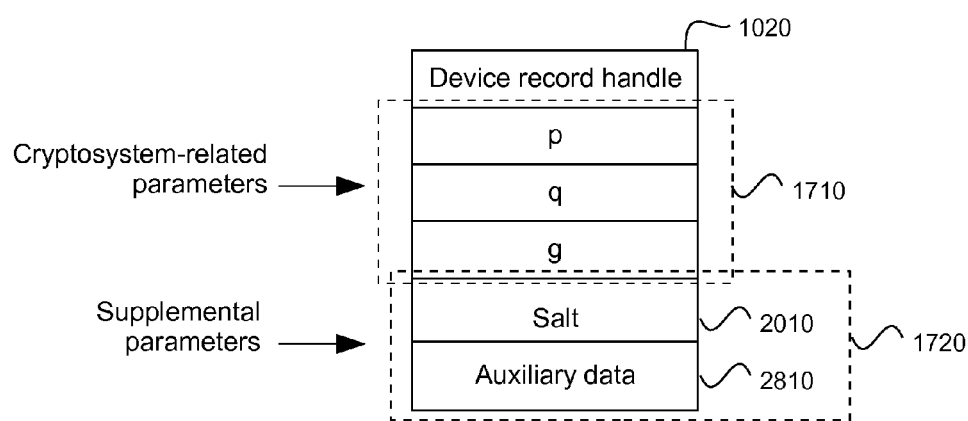
FIG. 28 is a block diagram illustrating a protocredential used to regenerate a credential containing a DSA key pair from a biometric sample.

FIG. 28 illustrates a protocredential 1020 that is used in conjunction with the non-stored secrets 1010 to regenerate the credential 350 of FIG. 16, according to some embodiments where the set of non-stored secrets consists of a biometric sample. The set of supplemental parameters 1720 consists of a random high-entropy salt 2010 and auxiliary data 2810 generated and used according to a biometric key generation method. The device record handle 1020 and the cryptosystem-related parameters 1710 are as in FIG. 17.

Figure 29:
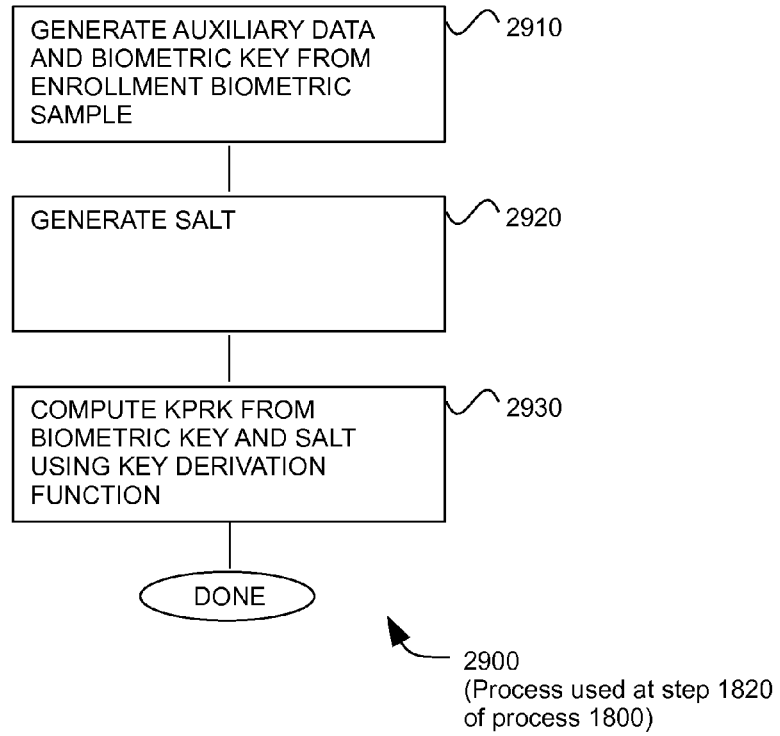
FIG. 29 is a flow diagram illustrating a process of generating supplemental parameters and computing a key-pair regeneration key from a biometric sample.

FIG. 29 is a flow diagram illustrating a process 2900 that takes place at step 1820 of process 1800 for generating a set of supplemental parameters 1720 and computing a KPRK, according to some embodiments where the set of non-stored secrets 1010 consists of a biometric sample, and the protocredential 1020 includes auxiliary data pertaining to a biometric key generation method as illustrated in FIG. 28. Process 1800 is performed at step 1230 of process 1200, after an enrollment biometric sample has been obtained at step 1220.

At 2910 the prover black-box generates the auxiliary data 2810 and a biometric key from the enrollment biometric sample, according to the biometric key generation method. Then the process continues at 2920.

At 2920 the prover black-box generates the salt 2010 as a random high-entropy string using an entropy accumulator such as the /dev/urandom facility of Linux and other Unix systems. Then the process continues at 2930.

At 2930 the prover black-box computes the KPRK by applying a key derivation function such as HKDF to the biometric key, used as Input Keying Material (IKM), and the salt, the length of output being N+64 bits, where N is the bitlength of the parameter q. Then the process terminates, having computed the KPRK and the set of supplemental parameters consisting of the auxiliary data and the salt.

Figure 30:
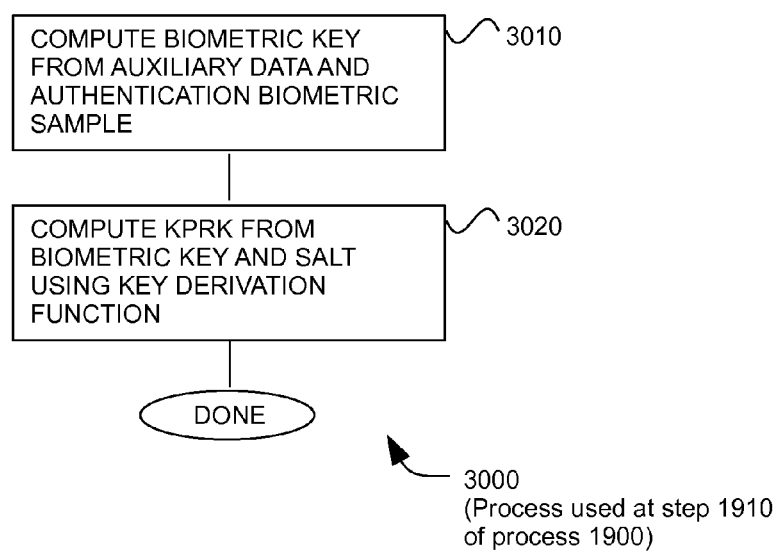
FIG. 30 is a flow diagram illustrating a process of generating a key-pair regeneration key from supplemental parameters and a biometric sample.

FIG. 30 is a flow diagram illustrating a process 3000 that takes place at step 1910 of process 1900 for computing a KPRK from the supplemental parameters 1720 in the protocredential 1020 and the non-stored secrets 1010, according to some embodiments where the set of non-stored secrets consists of a biometric sample, and the protocredential 1020 contains auxiliary data pertaining to a biometric key generation method as illustrated in FIG. 28. Process 1900 takes place at step 1260 of process 1200, after an authentication biometric sample has been obtained at step 1255.

At 3010 a biometric key is computed from the auxiliary data 2810 and the biometric sample according to the biometric key generation method. Then the process continues at 3020.

At 3020 the prover black-box computes the KPRK by applying HKDF to the biometric key, used as Input Keying Material (IKM), and the salt, the length of output being N+64 bits, where N is the bitlength of the parameter q. Then the process terminates.

Figure 31:
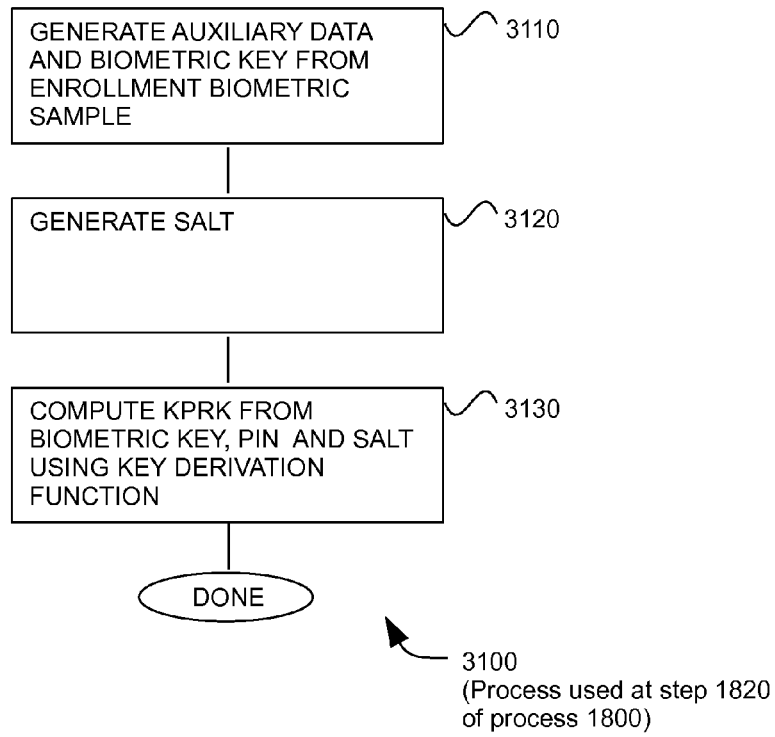
FIG. 31 is a flow diagram illustrating a process of generating supplemental parameters and computing a key-pair regeneration key from a biometric sample and a PIN.
Figure 32:
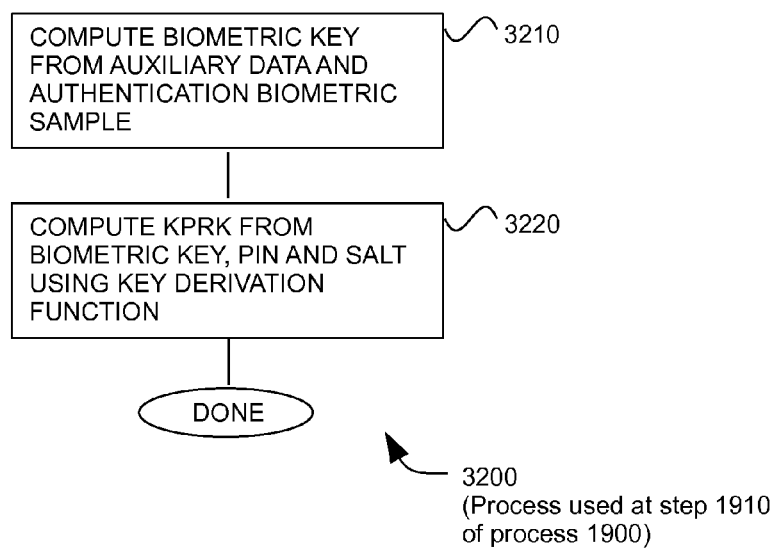
FIG. 32 is a flow diagram illustrating a process of generating a key-pair regeneration key from supplemental parameters, a biometric sample and a PIN.

FIGS. 31 and 32 are alternatives to FIGS. 29 and 30 illustrating some embodiments where a PIN is used as a non-stored secret in addition to a biometric sample. A protocredential containing a salt and auxiliary data as illustrated in FIG. 28 is used in the embodiments. FIG. 31 differs from FIG. 29 only in the computation of the KPRK. At step 3130, the PIN is used in addition to the biometric kay as Input Keying Material to HKDF. FIG. 32 differs from FIG. 30 in the computation of the KPRK at step 3220, in the same manner.

Embodiments that use ECDSA are similar to embodiments that use DSA.

Figure 33:
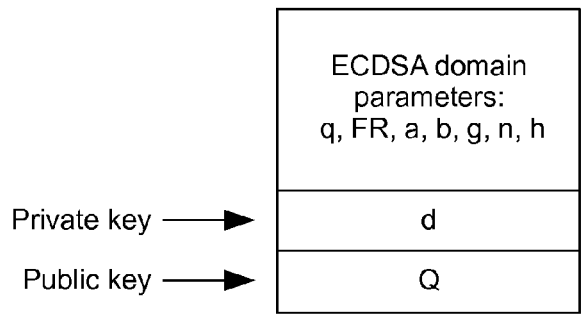
FIG. 33 is a block diagram illustrating a key pair pertaining to the ECDSA cryptosystem.

FIG. 33 illustrates an ECDSA key pair. It is similar to FIG. 15, which illustrates a DSA key pair. The ECDSA domain parameters q, FR, a, b, G, n, h, described in Section 6.1 of the DSS, are the counterparts of the domain parameters p, q, g of DSA in FIG. 15. The private key d is the counterpart of the private key x of FIG. 15, and the public key Q is the counterpart of the public key y of FIG. 15.

Figure 34:
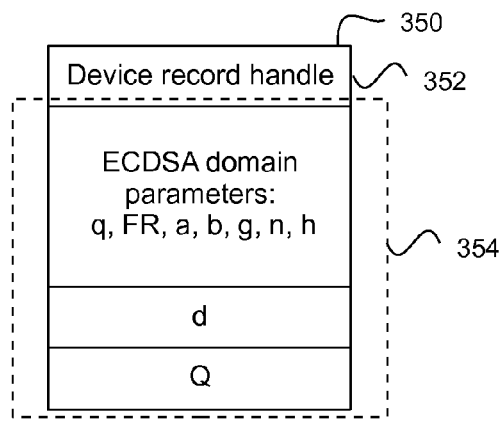
FIG. 34 is a block diagram illustrating a credential containing an ECDSA key pair.
Figure 35:
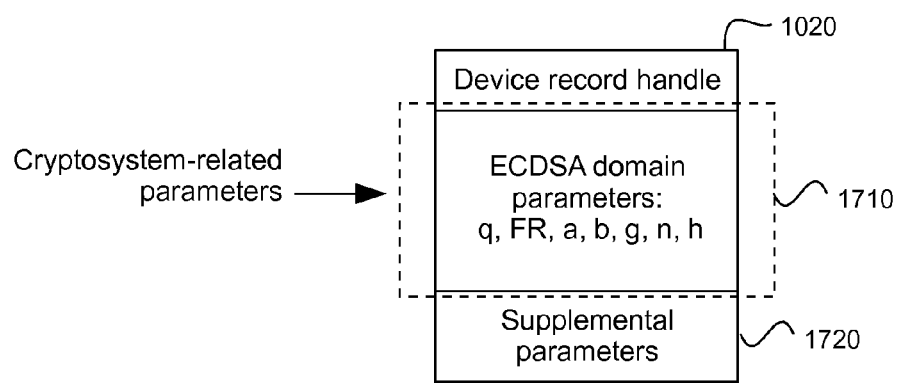
FIG. 35 is a block diagram illustrating a protocredential used to regenerate a credential containing a ECDSA key pair.
Figure 36:
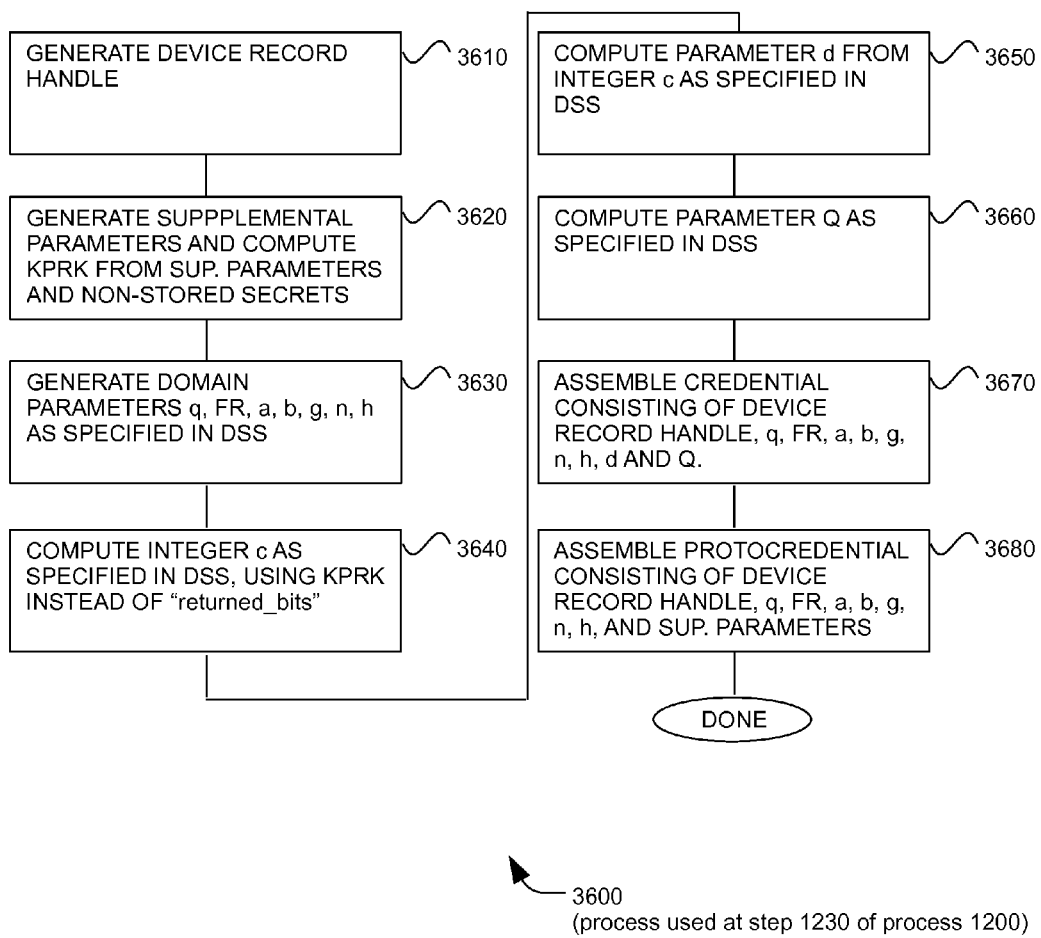
FIG. 36 is a flow diagram illustrating a process for generating a credential that contains an ECDSA key a pair and a protocredential.
Figure 37:
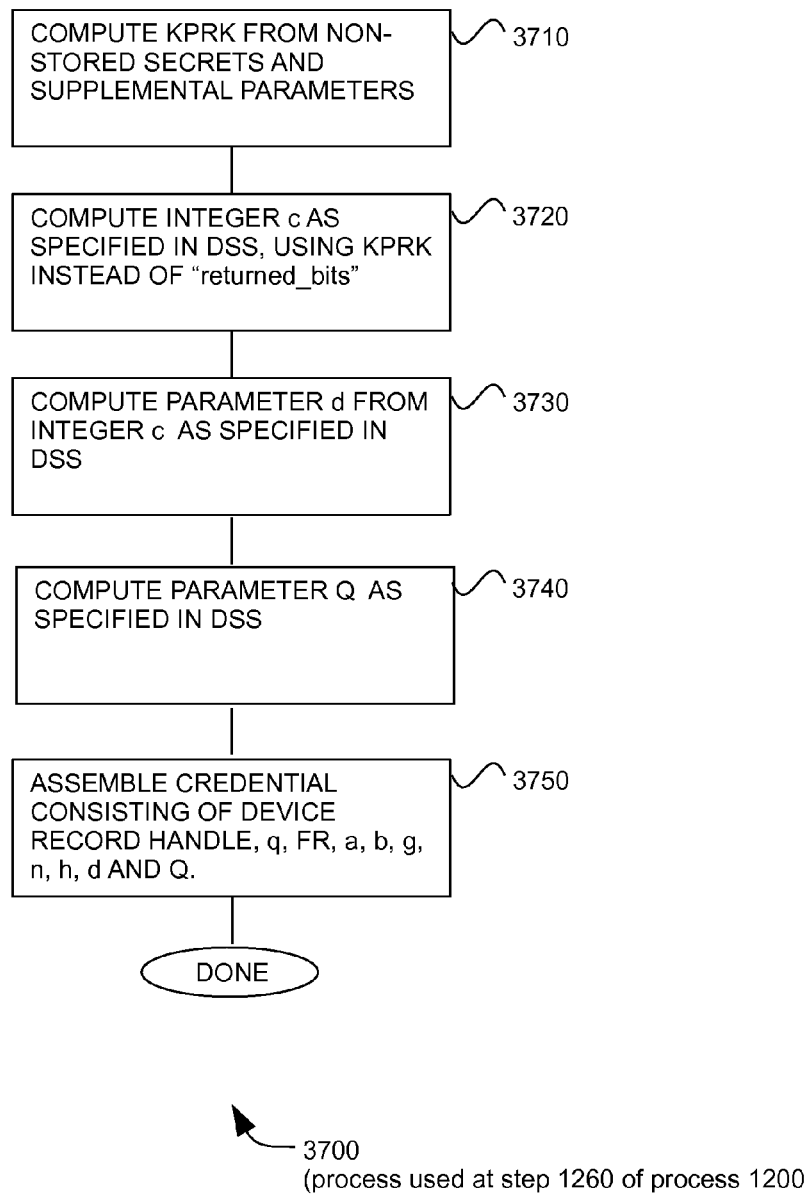
FIG. 37 is a flow diagram illustrating a process for regenerating a credential that contains an ECDSA key pair.

FIG. 34 illustrates a credential containing an ECDSA key pair, FIG. 35 illustrates a protocredential used to regenerate a credential that contains an ECDSA key pair, FIG. 36 illustrates a process for generating a credential that contains an ECDSA key pair and a corresponding protocredential, and FIG. 37 illustrates a process for regenerating a credential that contains an ECDSA key pair. They are the same as their DSA counterparts, FIGS. 16, 17, 18 and 19 respectively, mutatis mutandis. The generation of the parameters at step 3630 of process 3600 is specified in Section 6.1.1 of the DSS. The computations at steps 3640, 3650 and 3660 of process 3600, and 3720, 3730 and 3740 of process 3700 are specified in Appendix B.4.1 of the DSS.

FIGS. 38-42 illustrate embodiments that use the RSA cryptosystem, optimized using the Chinese Remainder Theorem and Garner's algorithm. These techniques are well known to cryptographers, and are described in Section 5 of the DSS, RFC 3447, and Sections 8.2, 11.3 and 14.5.2 of the Handbook of Applied Cryptography, by Alfred J. Menezes and Paul C. Van Oorschot, CRC Press, 1997.

Figure 38:
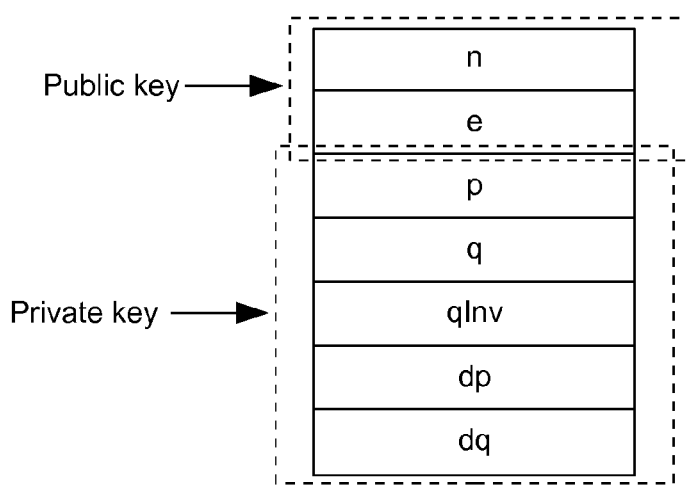
FIG. 38 is a block diagram illustrating a key pair pertaining to the RSA cryptosystem.
Figure 39:
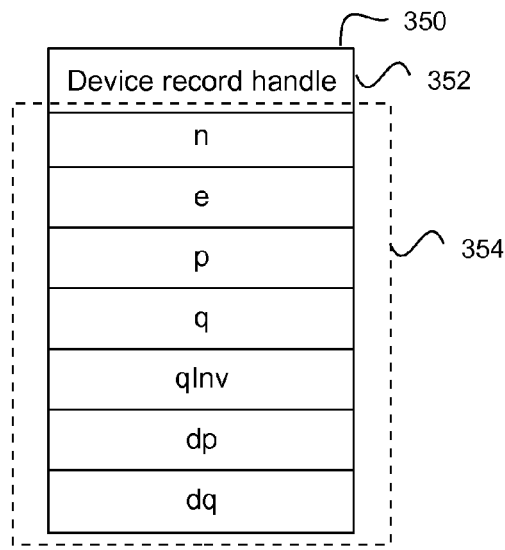
FIG. 39 is a block diagram illustrating a credential containing an RSA key pair.
Figure 40:
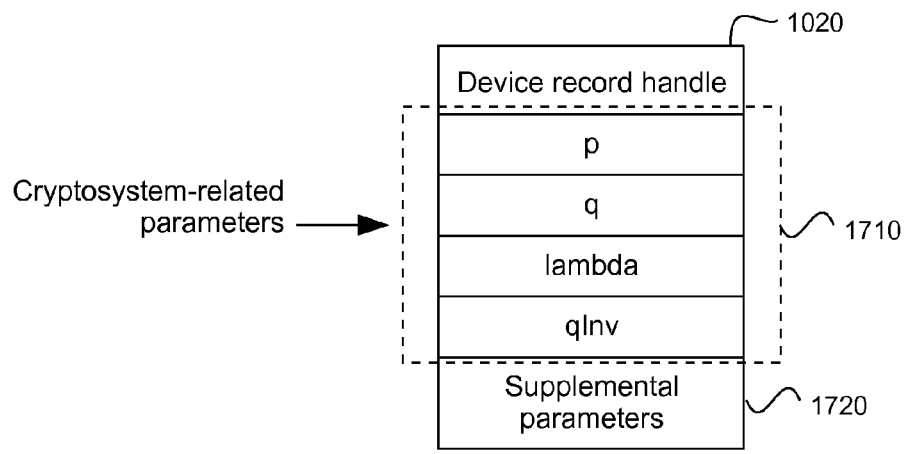
FIG. 40 is a block diagram illustrating a protocredential used to regenerate a credential containing an RSA key pair.

FIG. 38 illustrates a key pair of the cryptosystem; n is the RSA modulus, e the encryption exponent, p and q the factors of the modulus, qInv the inverse of q modulo p, dp=d mod (p−1), and dq=d mod q−1). FIG. 39 illustrates a credential containing a key pair. FIG. 40 illustrates a protocredential, lambda being the least common multiple (LCM) of p−1 and q−1.

Figure 41:
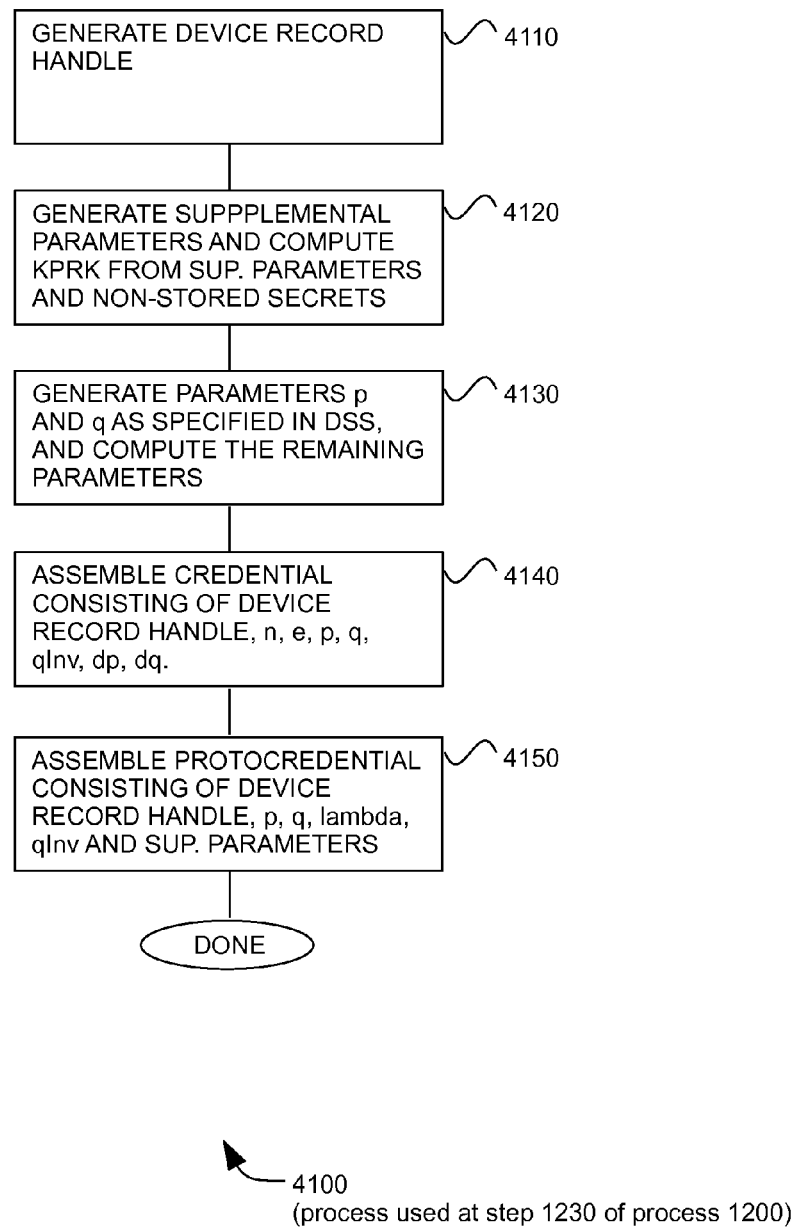
FIG. 41 is a flow diagram illustrating a process for generating a credential that contains an RSA key a pair and a protocredential.

FIG. 41 illustrates a process 4100 for generating the credential and the protocredential, which takes place at step 1230 of process 1200. Steps 4110 and 4120 are identical to steps 1810 and 1820 of process 1800. At 4130, p and q are generated and the remaining parameters are computed by the following algorithm, where N is the bitlength of the modulus, and c is the KPRK:

1. Generate p and q as specified in Section B.3 of the DSS.
2. Compute n=pq, lambda=LCM(p−1,q−1)
3. Compute qInv=q^(−1) (mod p).
4. Compute e=(c+1)/GCD(c+1,lambda). Start over at step 1 if e<2^(16).
5. Compute d=e^(−1) (mod lambda). Start over if d is less than or equal to 2^(N/2).
6. Compute dp=d mod (p−1) and dq=d mod (q−1).

The credential and protocredential are then assembled at steps 4140 and 4150 respectively.

Figure 42:
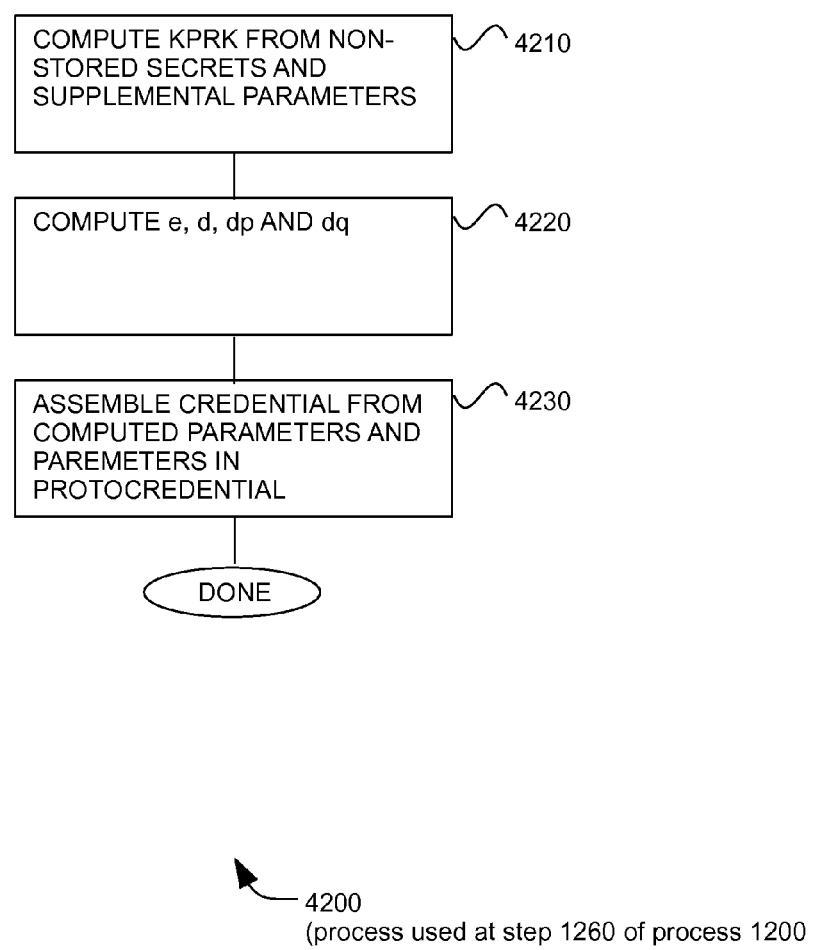
FIG. 42 is a flow diagram illustrating a process for regenerating a credential that contains an RSA key pair.

FIG. 42 illustrates a process 4200 for regenerating the credential from the protocredential, which takes place at step 1260 of process 1200. Step 4210 is identical to step 1910 of process 1900. At step 4220 the parameters e, d, dp and dq are computed by the following algorithm:

1. Compute e=(c+1)/GCD(c+1,lambda). Fail if e<2^(16).
2. Compute d=e^(−1) (mod lambda). Fail if d is less than or equal to 2^(N/2).
3. Compute dp=d mod (p−1) and dq=d mod (q−1).

Finally, the credential is assembled at step 4230.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A multifactor authentication method performed at a computing device, comprising:
   at registration time, obtaining a passcode from a user;
   at registration time, generating a protocredential comprising one or more parameters combinable with the passcode to generate a credential;
   at registration time, storing the protocredential in the computing device;

at registration time, generating the credential, the credential comprising a key pair, the key pair comprising a private key and a public key;

at registration time, using the credential to register the device and subsequently discarding the credential;

at authentication time, obtaining again the passcode from the user;

at authentication time, regenerating the credential from the protocredential stored in the computing device and the passcode obtained from the user, using a credential regeneration process having at least 1% probability of producing well-formed output and at most 0.1% probability of producing correct output from the protocredential and a random guess of the passcode, the random guess having a uniform probability distribution over the range of allowable passcodes; and at authentication time, proving possession of the credential to a verifier by sending the public key and a proof of knowledge of the private key to the verifier over a secure connection after the verifier has authenticated to the computing device.

2. The method of claim 1, wherein the key pair pertains to a digital signature public key cryptosystem and the proof of knowledge comprises a signature computed with the private key.

3. The method of claim 2, wherein the signature is computed on a challenge that comprises a nonce.

4. A multifactor authentication method performed at a computing device, comprising:

at registration time, generating a protocredential comprising one or more parameters combinable with one or more secrets not stored in the computing device to generate a credential;

at registration time, storing the credential in the computing device;

at registration time, generating the credential, the credential comprising a key pair, the key pair comprising a private key and public key;

at registration time, using the credential to register the device and subsequently discarding the credential;

at authentication time, obtaining from a user one or more secrets not stored in the computing device;

at authentication time, regenerating the credential from the protocredential stored in the computing device and the one or more secrets not stored in the device obtained from the user, by a credential regeneration process that does not include decryption steps other than steps that decrypt zero or more encrypted bare parameters; and at authentication time, proving knowledge of the private key to a verifier by sending the public key and a proof of knowledge of the private key to the verifier over a secure connection after the verifier has authenticated to the computing device.

5. The method of claim 4, wherein the one or more secrets obtained from the user at authentication time comprise a passcode.

6. The method of claim 4, wherein the credential regeneration process makes use of a biometric key, the biometric key being computed from a biometric sample that is one of the one or more secrets obtained from the user at authentication time and auxiliary data that is part of the protocredential.

7. The method of claim 4, wherein the protocredential comprises an encrypted bare parameter of the credential, and the credential regeneration process includes a step of decrypting the encrypted bare parameter.

8. A system comprising:
a back-end subsystem; and
a computing device programmed to register with the back-end subsystem and subsequently authenticate to the back-end subsystem, the computing device comprising an application front-end and a prover black-box, wherein at registration time, the computing device generates a protocredential comprising one or more parameters combinable with one or more secrets not stored in the computing device to generate a credential;

at registration time, the computing device stores the protocredential;

at registration time, the computing device generates the credential;

at registration time, the computing device uses the credential to register with the back-end subsystem and subsequently discards the credential;

at authentication time, the computing device obtains from a user one or more secrets not stored in the computing device;

at authentication time, the prover black-box regenerates the credential from the protocredential stored in the computing device and the one or more secrets not stored in the device obtained from the user, using a credential regeneration process having at least 1% probability of producing well-formed output and at most 0.1% probability of producing correct output from guesses of the one or more secrets not stored in the computing device;

at authentication time, the prover black-box authenticates cryptographically to the back-end subsystem by proving possession of the credential;

at authentication time, the prover black-box receives an authentication token from the back-end subsystem as verifiable confirmation of the cryptographic authentication;

at authentication time, the prover black-box sends the authentication token to the application front-end; and at authentication time, the application front-end sends the authentication token to the back-end subsystem.

9. The system of claim 8, wherein the one or more secrets obtained from the user at authentication time comprise a passcode.

10. The system of claim 8, wherein the credential comprises a private key that is part of a key pair pertaining to a public key cryptosystem, and proving possession of the credential includes proving knowledge of the private key.

11. The system of claim 8, wherein the public key cryptosystem is a digital signature cryptosystem and proving knowledge of the private key includes using the private key to sign a challenge.

12. The system of claim 8, wherein the credential regeneration process does not include decryption steps other than steps that decrypt zero or more encrypted bare parameters.

13. The system of claim 8, wherein the protocredential comprises an encrypted bare parameter of the credential, and the credential regeneration process includes a step of decrypting the encrypted bare parameter.

14. The system of claim 8, wherein the credential regeneration process makes use of a biometric key, the biometric key being computed from a biometric sample that is one of the one or more secrets obtained from the user at authentication time and auxiliary data that is part of the protocredential.

15. The system of claim 8, wherein the back-end subsystem keeps a count of consecutive authentication failures and sets a limit on the count.

16. The system of claim 8, wherein the authentication token uniquely identifies an object stored in the back-end subsystem that contains authentication data.

17. The system of claim 8, wherein the authentication token comprises digitally signed authentication data.

18. The system of claim 8, wherein the application front-end sends the authentication token to the back-end subsystem repeatedly as a login session identifier.

19. A computing device programmed to register with a back-end and subsequently authenticate to the back-end, the computing device comprising a prover black-box and an application front-end, the prover black-box being programmed to perform steps of:
- at registration time, generating a protocredential comprising one or more parameters combinable with one or more secrets not stored in the computing device to generate a credential;
- at registration time, storing the protocredential in the computing device;
- at registration time, generating the credential;
- at registration time, discarding the credential after the device has registered with the back-end;
- at authentication time, regenerating the credential from the protocredential stored in the device and one or more secrets not stored in the computing device that have been obtained from a user, using a credential regeneration process having at least 1% probability of producing well-formed output and at most 0.1% probability of producing correct output from guesses of the one or more secrets not stored in the computing device;
- at authentication time, authenticating cryptographically to the back-end by proving possession of the credential;
- at authentication time, receiving an authentication token from the back-end;
- at authentication time, sending the authentication token to the application front-end, the authentication token being submissible to the back-end by the application front-end as verifiable confirmation of the cryptographic authentication.

* * * * *